US010099381B1

(12) United States Patent
Yarlagadda et al.

(10) Patent No.: US 10,099,381 B1
(45) Date of Patent: *Oct. 16, 2018

(54) SYSTEM FOR CONFIGURING A ROBOTIC DEVICE FOR MOVING ITEMS

(71) Applicant: AMAZON TECHNOLOGIES, INC., Seattle, WA (US)

(72) Inventors: Pradeep Krishna Yarlagadda, Berlin (DE); Cédric Philippe Charles Jean Ghislain Archambeau, Berlin (DE); James Christopher Curlander, Mercer Island, WA (US); Michael Donoser, Berlin (DE); Ralf Herbrich, Falkensee (DE); Barry James O'Brien, Seattle, WA (US); Marshall Friend Tappen, Bainbridge Island, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/651,446

(22) Filed: Jul. 17, 2017

Related U.S. Application Data

(63) Continuation of application No. 15/165,336, filed on May 26, 2016, now Pat. No. 9,731,420, which is a continuation of application No. 14/563,609, filed on Dec. 8, 2014, now Pat. No. 9,381,645.

(51) Int. Cl.
*G06K 15/00* (2006.01)
*B25J 9/16* (2006.01)
*B65G 1/137* (2006.01)

(52) U.S. Cl.
CPC ........... *B25J 9/1697* (2013.01); *B25J 9/1633* (2013.01); *B65G 1/1378* (2013.01)

(58) Field of Classification Search
CPC ....... G06Q 30/06; G06Q 20/20; G07G 1/0054
USPC ........................................................ 235/383
See application file for complete search history.

(56) References Cited

U.S. PATENT DOCUMENTS

| | | | |
|---|---|---|---|
| 8,798,790 B2 | 8/2014 | Kamiya et al. | |
| 8,831,777 B2 | 9/2014 | Kimoto | |
| 8,875,584 B2 | 11/2014 | Sasajima | |
| 8,903,550 B2 | 12/2014 | Lee et al. | |
| 9,731,420 B1* | 8/2017 | Yarlagadda | B25J 9/1697 |
| 2003/0111536 A1 | 6/2003 | Mehlberg et al. | |
| 2006/0004487 A1 | 1/2006 | Sugiyama | |

(Continued)

OTHER PUBLICATIONS

Kim, Ahshik, "Ex Parte Quayle Action dated Oct. 9, 2015", U.S. Appl. No. 14/563,609, The United States Patent and Trademark Office, Oct. 9, 2015.

(Continued)

*Primary Examiner* — Ahshik Kim
(74) *Attorney, Agent, or Firm* — Lindauer Law, PLLC

(57) ABSTRACT

Described are techniques for storing and retrieving items using a robotic device for moving items. Any combinations of image data depicting a manipulator interacting with an item, sensor data from sensors instrumenting the manipulator or item, item data regarding characteristics of the item, and constraint data relating to characteristics of the robotic device may be used to generate one or more configurations for the robotic device. The configurations may include points of contact and force vectors for contacting the item using the robotic device.

20 Claims, 8 Drawing Sheets

(56) References Cited

U.S. PATENT DOCUMENTS

2012/0253512 A1  10/2012  Sato et al.
2014/0257559 A1   9/2014  Micaelli
2015/0314450 A1  11/2015  Chiu et al.

OTHER PUBLICATIONS

Kim, Ahshik, "Notice of Allowance dated Mar. 1, 2016", U.S. Appl. No. 14/563,609, The United States Patent and Trademark Office, Mar. 1, 2016.
Kim, Ahshik, "Non-final Office Action dated Nov. 1, 2016", U.S. Appl. No. 15/165,336, The United States Patent and Trademark Office, Nov. 1, 2016.
Kim, Ahshik, "Notice of Allowance dated Apr. 12, 2017", U.S. Appl. No. 15/165,336, The United States Patent and Trademark Office, Apr. 12, 2017.

* cited by examiner

SYSTEM FOR CONFIGURING A ROBOTIC DEVICE FOR MOVING ITEMS

PRIORITY

This application is a continuation of, and claims priority to, pending U.S. patent application Ser. No. 15/165,336, filed on May 26, 2016, entitled "System for Configuring a Robotic Manipulator". Application Ser. No. 15/165,336 is incorporated by reference herein in its entirety.

Application Ser. No. 15/165,336 is a continuation of, and claims priority to, U.S. patent application Ser. No. 14/563,609, filed on Dec. 8, 2014, entitled "System for Automating Manipulation of Items", now issued as U.S. Pat. No. 9,381,645. Application Ser. No. 14/563,069 is incorporated by reference herein in its entirety.

BACKGROUND

Many storage facilities use computer-assisted processes to catalog the specific locations of stored items within the facility. In some facilities, storage containers, such as shelves, bins, and so forth, may be mechanically transported to various locations within the facility, including locations accessible by human operators. Human operators, however, are responsible for locating specific items within a container for retrieval, and for placing additional items into a container for stowage.

BRIEF DESCRIPTION OF FIGURES

The detailed description is set forth below with reference to the accompanying figures. In the figures, the left-most digit(s) of a reference number identifies the figure in which the reference number first appears. The use of the same reference numbers in different figures indicates similar or identical items or features.

Figure 1:
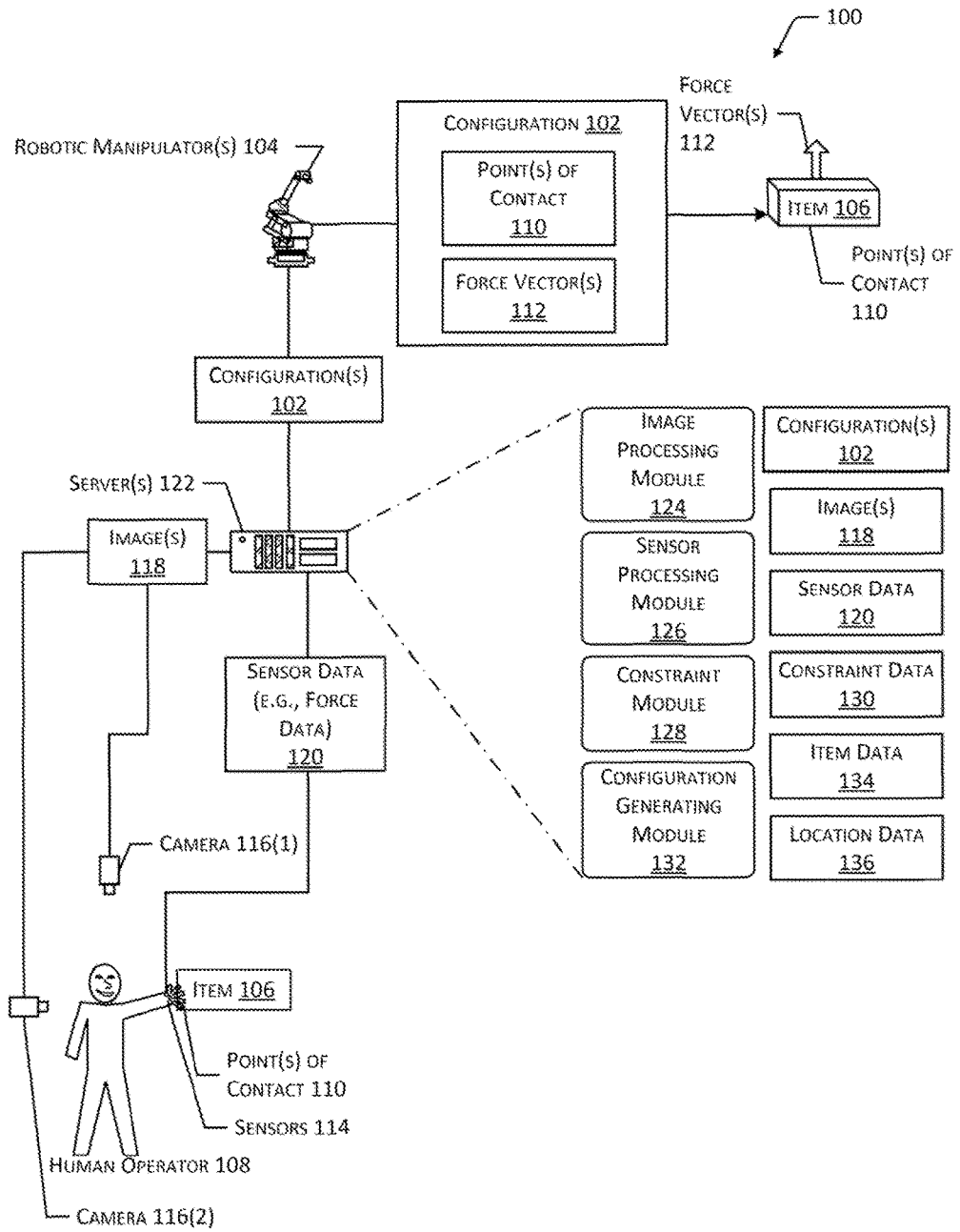
FIG. 1 depicts a system for determining one or more configurations by which one or more robotic manipulators may interact with one or more items.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include," "including," and "includes" mean including, but not limited to.

DETAILED DESCRIPTION

Items retained in inventory associated with a merchant or vendor are typically stowed at a storage facility, such as a warehouse. When additional items for inventory are received, they are stowed in the facility, and the location of the one or more items within the facility may be recorded to enable subsequent retrieval. When an item is purchased or other events, such as movement of items between locations within a facility, make it necessary to retrieve the item, the recorded location of the item may be accessed, and the item may be removed from the facility or moved to another location within the facility. Changes in the locations of the items, including removal of the items, may similarly be recorded. Computer-based systems may be used to facilitate maintenance of an accurate log of the location of each item within one or more facilities, providing increased efficiency and fewer errors over manual means, which may be subject to inaccurate entries of items or locations. In some facilities, storage containers, such as shelves, bins, crates, totes, and so forth, may be mechanically moved between locations within a facility, reducing the need for human operators to travel to the location of a container or move containers through manual means. Due to unique physical characteristics of each item, and the unique arrangement of items within each container, the acts of placing items into containers and removing items from containers may be performed by human operators. For example, human operators may grip, lift, move, or otherwise manipulate items by hand or using another manual manipulator. Manual manipulators may include human hands; suction-based, vacuum-based, or ferromagnetic hand tools; lifting devices such as forklifts; and so forth. Many stowage and retrieval processes performed by human operators, such as locating a specific item within a container containing numerous other items, are prone to inefficiency and error. For example, human operators may require significant time to locate a single item within a container, may retrieve an improper item, may stow an item in an improper location, may fail to properly record stowage or retrieval of an item, and so forth.

Described herein are techniques for automating one or more stowage and retrieval processes by enabling such processes to be performed using a robotic manipulator, such as a robotic hand or a similar robotic gripping or support device. Robotic gripping devices may include vacuum lifters, suction-based grippers, ferromagnetic-based grippers, and so forth. Images depicting one or more human operators interacting with an item, such as images showing the position of an operator's hand(s) when gripping or lifting an item, may be accessed from a data store. For example, images of a human operator interacting with an item may be obtained using one or more cameras and stored for subsequent use in association with a robotic manipulator to generate a model from which configurations for interaction between the robotic manipulator and the item may be determined. In some implementations, a human operator may be instrumented with position sensors for determining the position of the operator's hands or other body portions, force sensors for determining the force applied to an item by the operator's hands or other body portions, or both position sensors and force sensors. For example, a human operator may wear gloves or other articles having sensors associated therewith. In other implementations, an item with which a human operator interacts may be instrumented with one or more of position sensors or force sensors. From the images and sensor data, one or more points of contact between the human operator and the item may be determined. One or more force vectors associated with at least a portion of the points of contact may also be determined from the images and sensor data.

In some implementations, item data relating to one or more physical characteristics of an item, such as the item's weight, dimensions, weight distribution (e.g., center of mass), material characteristics (e.g., durability and compressibility), and so forth, may be accessed. In some implementations, constraint data may be accessed from a data store. Constraint data may include limitations regarding one or more of the following: the movement of a robotic manipulator; the types of items or containers with which the robotic manipulator may interact; the locations at which the robotic manipulator may be operated; physics-based constraints, such as certain forces or points of contact that may not successfully grip or support an item independent of the physical limitations of the robotic manipulator or the item; and so forth.

The information determined from the images and sensors, the item data, and the constraint data may be used to generate one or more possible configurations of the robotic manipulator with respect to an item. Each configuration may include one or more points of contact between the robotic manipulator and the item as well as one or more force vectors associated with at least a portion of the points of contact. For example, based on characteristics of an item determined from the images and the item data, and based on constraint data relating to the item and the robotic manipulator, a model may be generated. The model may include one or more suitable points of contact at which the item may be contacted by a robotic manipulator. The points of contact may be determined, for example, based on the weight distribution and material characteristics of the item. The suitable points of contact may be constrained based on the configuration and capabilities of the robotic manipulator. Each point of contact may include a maximum force vector that may be applied thereto, also determined from the item data or constraint data. When multiple possible configurations are determined, the configuration that is most suitable for accessing the item at its current location may be determined and executed. For example, different configurations may be used depending on the orientation of an item.

A configuration may be executed when a request associated with placement of an item is received. For example, a request may include an instruction to place an item into a container or to retrieve a stored item. Location data corresponding to the item may be accessed from a data store. The location data may include one or more of the current location of a stowed item, the current location of an item to be stowed, or the destination stowage location of an item to be stowed. One or more of the robotic manipulator, the item, or a container containing the item may be moved into a position such that the robotic manipulator may contact and move the item. The robotic manipulator may contact one or more portions of the item that correspond to the points of contact in the determined configuration. The robotic manipulator may also apply one or more forces to the item that correspond to the force vectors in the determined configuration, to move the item into or from a container or other location.

In some implementations, one or more images may include a current location of the item relative to one or more additional objects, such as an image depicting the item within a container alongside other objects. Other objects may include additional items, walls or other portions of the container, debris, packaging materials, and so forth. From the one or more images, one or more constraints relating to the robotic manipulator may be determined. For example, passage of the robotic manipulator between the item and one or more additional objects or manipulation of the item relative to one or more additional objects may be restricted or impossible. Continuing the example, the arrangement of the objects, the sides of the container, and so forth may inhibit movement of the robotic manipulator. Configurations by which the robotic manipulator may interact with the item may be modified or restricted based on the one or more constraints determined from the one or more images. If no configuration for interaction with the item may be determined based on the one or more images, an indication of the one or more constraints may be provided to a computing device associated with a human operator to enable a human operator to complete tasks not suitable for completion using the robotic manipulator.

In some implementations, an indication of one or more constraints may be provided to the device associated with a human operator based on the item data or the constraint data. For example, the dimensions, weight, shape, material characteristics, and so forth, of an item may indicate that an item cannot be safely or effectively handled using a robotic manipulator. An indication provided to the device associated with the human operator may describe the characteristics of the item that cause the item to be unsuitable for manipulation by the robotic manipulator. In another example, the shape or current location of an item may prevent access to the item by the robotic manipulator due to limitations in the range of movement of the robotic manipulator or the dimensions thereof. In some implementations, items or containers suitable for access by a robotic manipulator may be stowed at a location within a facility that is readily accessible to the robotic manipulator. Items or containers unsuitable for access by a robotic manipulator may be stowed at other locations readily accessible to human operators.

In some implementations, one or more determined configurations of a robotic manipulator may be modified using an accuracy metric, which may include a determination of the effectiveness of a configuration. The effectiveness of a configuration may be measured using a physical test. For example, the robotic manipulator may be positioned relative to an item and a container configured to contain the item. The robotic manipulator may then be used to contact one or more portions of the item corresponding to the points of contact of the determined configuration. The robotic manipulator may also apply forces to the points of contact that correspond to the force vectors of the determined configuration to move the item relative to the container. An accuracy metric associated with movement of the item may be determined, and the configuration may be modified based, at least in part, on the accuracy metric. For example, if attempted movement of an item by the robotic manipulator damages or drops the item, the location of one or more points of contact between the robotic manipulator and the item or one or more forces applied by the robotic manipulator may be modified based on this determination. Continuing the example, if an item is dropped during transport by the robotic manipulator, the configuration may be modified to apply a greater force to one or more portions of the item such that the robotic manipulator grips the item more tightly. If an item rotates or moves significantly during transport by the robotic manipulator, the configuration may be modified to increase the surface area of one or more points of contact or more widely space the points of contact apart to provide the item with increased stability. In some implementations, one or more of the item or the robotic manipulator may be provided with a support that prevents falling of the item in the event that the configuration applied by the robotic manipulator fails to securely grip or stabilize the item. In other implementations an accuracy metric may be determined by analyzing an item within a container, such as through use of one or more cameras. The position of the item, within three dimensions, may be compared to images depicting the interactions between human operators and the item to determine whether a particular configuration may be more accurate than other configurations based on the current position of the item and the depicted images that most closely match the position of the item.

In some implementations, configurations may be determined based on a reference position (e.g., orientation) of an item. To manipulate an item, the robotic manipulator may be positioned relative to the item, or the item may be positioned relative to the robotic manipulator. Movement of the item, the robotic manipulator, or both the item and robotic manipulator may result in the item being oriented in the reference position relative to the robotic manipulator. In other implementations, the item may be moved, using the robotic manipulator or other means, such as other automated devices or manually by a human operator, to position the item in the reference position relative to the robotic manipulator.

Techniques described herein may enable automation of stowage and retrieval operations in a facility while identifying operations better suited for human operators. Techniques described herein may be implemented using data obtained from normal operations, such as images depicting human operators interacting with items, and sets of known constraints. Automation of stowage and retrieval operations may increase efficiency and reduce errors by reducing the time expended locating items and reducing the possibility of improperly placing items or retrieving improper items.

FIG. 1 depicts a system 100 for determining one or more configurations 102 that enable one or more robotic manipulators 104 to interact with an item 106. For example, a human operator 108 may grip, lift, move, or otherwise manipulate an item 106 using hands, other portions of the body, or other manual manipulators. Other manual manipulators may include vacuum-based, suction-based, friction-based, adhesive-based, or ferromagnetic-based hand tools, lifting devices such as forklifts, and so forth. The manner in which the human operator 108 interacts with the item 106 may include one or more points of contact 110 between the human operator 108 and the item 106 or between a manual manipulator and the item 106. The human operator 108 may apply one or more forces to one or more of the points of contact 110, each force having a magnitude and a direction, thereby defining one or more force vectors 112.

Implementations described herein may enable one or more robotic manipulators 104 to interact with an item 106 by determining configurations 102 for the robotic manipulator(s) 104 that include points of contact 110 and force vectors 112 based on the points of contact 110 and force vectors 112 used by a human operator 108. In some implementations, the points of contact 110 and force vectors 112 may directly correspond to those used by the human operator 108. However, in other implementations, the configuration(s) 102 may include a larger or smaller number of points of contact 110 or different force vectors 112 than those used by the human operator 108 due to other constraints. For example, the manner in which a human operator 108 contacts an item 106 may be used to generate a model associated with the item 106. Constraints associated with the robotic manipulator 104 or the item 106 may prevent use of the same points of contact 110 and force vectors 112 applied by the human operator 108. The model of the item 106 and the known constraints may be used to determine a configuration 102 suitable for use with the robotic manipulator 104. Example constraints may include limitations on a range of movement of the robotic manipulator(s) 104, the type of gripping or support elements used by a robotic manipulator 104, characteristics of the item 106, characteristics of a location of the item 106, and so forth. For example, the center of mass of an item 106 and the material characteristics thereof may be determined from a human operator 108 interacting with the item 106. Rather than duplicating the points of contact 110 and force vectors 112 applied by the human operator 108, a configuration 102 generated for use with the robotic manipulator 104 may include alternate points of contact 110 and force vectors 112 based on the item 106 characteristics and the constraints associated with the robotic manipulator 104.

Robotic manipulators 104 may include any manner of robotic devices configured to contact and move one or more items 106. In some implementations, the robotic manipulator(s) 104 may include a robotic arm and hand that simulates a human hand, having five fingers, 27-degrees of freedom of movement, and so forth. In other implementations, a robotic arm and hand having fewer than five digits may be used. In still other implementations, robotic manipulators 104 may include other types of gripping or lifting mechanisms, such as a platform similar to a forklift or spatula, suction-based grippers, vacuum-based grippers, ferromagnetic-based grippers, adhesive-based grippers, friction-based grippers, grippers configured to at least partially penetrate an item 106, and so forth. The configurations 102 determined for interaction between a robotic manipulator 104 and an item 106 may be based, at least in part, on the specific characteristics of the robotic manipulator 104 used. While FIG. 1 depicts a single robotic manipulator 104, in some implementations, multiple robotic manipulators 104 may be used. For example, two robotic manipulators 104 may be used to interact with an item 106 in a manner simulating two human hands. Continuing the example, multiple robotic manipulators 104 may be used to interact with an item 106 in a manner simulating more than one human operator 108.

The interactions of a human operator 108 with the item 106 may be recorded using one or more sensors 114. One or more cameras 116 or other types of image sensors may be used to generate one or more images 118 of the human operator 108 interacting with the item 106. In some implementations, multiple cameras 116 may be used to generate images 118 of one or more of the human operator 108 or the item 106 from multiple viewpoints. For example, in FIG. 1, a first camera 116(1) is depicted at a first position relative to the human operator 108 and the item 106, and a second camera 116(2) is depicted at a second position relative to the human operator 108 and the item 106. Any number or types of cameras 116 may be used. One or more cameras 116 may include depth cameras (e.g., Red-Green-Blue plus Depth (RGB-D) cameras) or other types of depth sensors such as time-of-flight (ToF), flash lidar, or range cameras, which may be used to determine a distance between the camera 116 and the human operator 108 or the item 106.

The camera(s) 116 or other image sensors may be configured to detect light in one or more wavelengths including, but not limited to, terahertz, infrared, visible, ultraviolet, and so forth. The camera(s) 116 or other image sensors may include charge coupled devices (CCD), complementary metal oxide semiconductor (CMOS) devices, microbolometers, and so forth. In some implementations, the camera(s) 116 or other image sensors may include integrated or discrete light sensors configured to provide information associated with ambient lighting conditions such as a level of illumination.

In some implementations, one or more of the human operator 108 or the item 106 may have one or more other types of sensors 114 associated therewith. For example, one or more sensors 114 may be positioned on the body of the human operator 108, such as integrated within a glove or other article of clothing or jewelry. In other implementations, one or more sensors 114 may be positioned on the item 106. In still other implementations, sensors 114 may be associated with a manual manipulator used by a human operator 108 to interact with the item 106. The sensors 114 may include one or more force sensors, which may determine sensor data 120, indicative of a force applied by the human operator 108 to the item 106 at one or more points of contact 110 between the human operator 108 or manual manipulator and the item 106. Force sensors may include one or more load cells, strain gauges, transducers, force sensitive resistors, pressure sensors, touch sensors, and so forth.

In some implementations, the sensors 114 may include position sensors, which may determine sensor data 120 indicative of the position or pose of one or more parts of the body of the human operator 108, another manual manipulator, or item 106. Position sensors may include proximity sensors, touch sensors, radio frequency identification (RFID) or near field communication (NFC) sensors, orientation or motion sensors, three-dimensional (3D) sensors, location sensors, and so forth. For example, a proximity sensor may use optical, electrical, ultrasonic, electromagnetic, or other techniques to determine a presence of an object. Continuing the example, an optical proximity sensor may use ToF, structured light, interferometry, or other techniques to generate distance data. Touch sensors may use resistive, capacitive, surface capacitance, projected capacitance, mutual capacitance, optical, Interpolating Force-Sensitive Resistance (IFSR), or other mechanisms to determine the position of a touch or near-touch of an object. For example, IFSR material may be configured to change electrical resistance responsive to an applied force. The location within the material of the change in electrical resistance may indicate the position of a touch. RFID sensors may include RFID readers configure to detect RFID tags, RFID receivers configured to detect RFID readers, and so forth. RFID tags may be configured to emit a radio frequency signal, such as upon activation by an external signal. Such external signals may include, for example, a radio frequency signal or a magnetic field. Orientation or motion sensors may include a gyroscope, a magnetometer, an accelerometer, and so forth. For example, a magnetometer may determine an orientation of a sensor 114 associated with an object by measuring ambient magnetic fields, such as the terrestrial magnetic field. 3D sensors may acquire spatial or 3D data, such as distance, 3D coordinates, point cloud, and so forth, about objects within a sensor's 114 field-of-view. For example, 3D sensors may include range cameras, lidar systems, sonar systems, radar systems, coded aperture systems, structured light systems, stereo vision systems, optical interferometry systems, and so forth. Location sensors may include radio navigation-based systems such as terrestrial or satellite-based navigational systems. The satellite-based navigational systems may include a Global Positioning System (GPS) receiver, a global navigation satellite system (GLONASS) receiver, a Galileo receiver, a BeiDou Navigation Satellite System (BDS) receiver, an Indian Regional Navigational Satellite System, and so forth.

FIG. 1 depicts the cameras 116 and sensors 114 providing images 118 and sensor data 120 to one or more servers 122. The server(s) 122 may store one or more modules and one or more types of data for determining configurations 102 by which the robotic manipulator(s) 104 may interact with the one or more items 106. While FIG. 1 depicts the server(s) 122 in communication with the cameras 116, sensors 114, and robotic manipulator(s) 104, in some implementations, the cameras 116 and sensors 114 may communicate directly with the robotic manipulator(s) 104. In other implementations, one or more other computing devices may be provided in communication with the robotic manipulator(s) 104, the cameras 116, and the sensors 114. Computing devices may include mobile devices, smartphones, set-top boxes, tablet computers, personal computers, wearable computers, or other types of computing devices. The cameras 116, sensors 114, robotic manipulator(s) 104, server(s) 122, and other computing devices may communicate using one or more networks (not shown), which may include, without limitation, a personal area network (PAN), local area network (LAN), wide area network (WAN), and so forth. Networks may communicate using Ethernet, Wi-Fi®, Bluetooth®, ZigBee®, 3G, 4G, LTE, Z-Wave, or other technologies.

An image processing module 124 stored on the server 122 may be used to process one or more images 118 received from the cameras 116 or other image sensors. For example, images 118 depicting a human operator 108 gripping or lifting an item 106 may be used to determine points of contact 110 between the body of the human operator 108 and the item 106. The direction of one or more force vectors 112 applied by the human operator 108 may be determined from the image(s) 118. For example, the pose of the body of the human operator 108 may indicate the approximate direction in which one or more forces were applied to the item 106. In some implementations, the approximate magnitude of one or more of the force vectors 112 may be determined from the image(s) 118. For example, the pose of the body of the human operator 108 or visible deformation of the item 106 may be used to determine the magnitude of a force applied to the item 106, such as by enabling the approximate weight of the item to be determined. Continuing the example, the pose of the body of the human operator 108 may be used to determine if an item 106 is "heavy" or "not heavy." Operations relating to items 106 determined to be heavy may be provided to human operators 108 or to robotic manipulators 104 adapted for use with heavy items 106. In other implementations, the position, movement, or deformation of the item 106 relative to the human operator 108 may be used to determine material characteristics of the item 106. The image(s) 118 may also be used to determine the shape and the approximate dimensions of the item 106. In one implementation, the image processing may be performed at least in part by using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org.

A sensor processing module 126 may be stored on the server 122 and used to process sensor data 120 received from one or more sensors 114. For example, the sensor processing module 126 may determine one or more of the magnitude or direction of the force vectors 112 applied by the human operator 108 to the item 106 from sensor data 120 provided by force sensors. Continuing the example, the sensor processing module 126 may determine one or more points of contact 110 with the item 106 from sensor data 120 provided by one or more position sensors, location sensors, touch sensors, proximity sensors, and so forth.

A constraint module 128 may be stored on the server 122 and may access constraint data 130 relating to constraints of the robotic manipulator(s) 104, the item 106, a location at which the item 106 or the robotic manipulator(s) 104 are positioned, or one or more physics-based constraints. The constraint module 128 may be used to determine constraints that limit configurations 102 able to be used by the robotic manipulator(s) 104 with the item 106. For example, the specific type of gripping mechanism used by the robotic manipulator 104 may prevent the robotic manipulator 104 from simulating each point of contact 110 provided to the item 106 by a human operator 108. Continuing the example, a robotic manipulator 104 lacking a gripping appendage with five fingers may be unable to duplicate the grip provided by a human hand. In another example, the item 106 may be positioned in a location having close tolerances, such as a full or mostly-full container, that are smaller than the dimensions of at least a portion of the robotic manipulator 104, such that the robotic manipulator 104 may not be able to access the item 106. Similarly, depending on the nature of the facility in which the item 106 is located, it may not be possible for the robotic manipulator 104 or the item 106 to be moved within proximity of one another to enable the robotic manipulator 104 to interact with the item 106. In some implementations, the constraint module 128 may determine one or more constraints based on one or more characteristics or the nature of the item 106. For example, an item 106 that is fragile, compressible or bendable, or irregularly shaped may be unsuitable for handling by a robotic manipulator 104 or may require a unique configuration 102 based on a model of the item 106 determined from the images 118 and the characteristics of the item 106. The shape or durability of the item 106 may be determined using images 118, sensor data 120, stored data regarding the item 106, and so forth.

The constraint data 130 may include one or more physics-based constraints. In some implementations, the constraint module 128 may determine that one or more configurations 102 between the robotic manipulator(s) 104 and the item 106 that may be possible to implement may likely result in dropping of the item 106, gripping of the item 106 in excess of the tolerance thereof, or damage to the item 106 or robotic manipulator(s) 104. For example, a configuration 102 that includes a single point of contact 110 between a robotic manipulator 104 and an item 106 may be possible to implement, but it may be unlikely that such a configuration 102 may securely retain an item 106 in association with the robotic manipulator 104 for a length of time necessary to move the item 106 to a different location.

A configuration generating module 132 may also be stored on the server 122 and used to determine one or more configurations 102 by which the robotic manipulator(s) 104 may interact with items 106. The configuration generating module 132 may process the data generated by the image processing module 124 from the one or more images 118, the sensor data 120 from the sensor processing module 126, one or more constraints determined by the constraint module 128 using the constraint data 130, and item data 134 relating to one or more physical characteristics of the item 106 to determine one or more configurations 102. Physical characteristics of the item 106 may include the weight, dimensions, shape, a distribution of weight, material characteristics (e.g., durability, fragility, etc.), and so forth, of the item 106.

In some implementations, the image processing module 124 may determine one or more points of contact 110 between a human operator 108 and an item 106 using images 118 acquired by the cameras 116. The sensor processing module 126 may determine one or more force vectors 112 applied to the item 106 by the human operator 108. Using these determinations and the item data 134, the configuration generating module 132 may determine one or more combinations of points of contact 110 and force vectors 112 that may effectively grip, lift, or otherwise manipulate the item 106. However, characteristics of the robotic manipulator(s) 104, such as range of motion, dimensions, the number and type of appendages used to manipulate items 106, and so forth, may limit the ability of the robotic manipulator(s) 104 to duplicate all points of contact 110 and force vectors 112 determined by the image processing module 124 and the sensor processing module 126. Responsive to constraints determined by the constraint module 128, the points of contact 110 and force vectors 112 initially determined by the configuration generation module 132 may be modified. For example, a robotic manipulator 104 that lacks a five-fingered appendage may apply fewer points of contact 110 to the same portion of an item 106 than the points of contact 110 applied by a human operator 108. One or more points of contact 110 applied by the robotic manipulator 104 may include an increased surface area or may be more widely spaced apart to provide similar stability to the item 106 even though the grip of the human operator 108 is not identically duplicated by the robotic manipulator 104. In some implementations, one or more points of contact 110 or force vectors 112 may be discarded as unsuitable or impossible based on constraints determined by the constraint module 128. In other implementations, the points of contact 110 and force vectors 112 used by the robotic manipulator 104 may differ from those used by a human operator 108. For example, images 118 depicting interactions between human operators 108 and an item 106, item data 134 relating to the item 106, and constraint data 130 relating to physics-based constraints may be used to generate a model of interactions between the item 106 and the robotic manipulator 104. Using the model and the constraint data 130, a set of points of contact 110 and force vectors 112 that may be used by the robotic manipulator 104, may be determined. For example, item data 134 and images 118 depicting the interaction of human operators 108 with an item 106 may be used to determine a center of mass associated with the item 106. Points of contact 110 between the human operators 108 and the item 106 may be determined from the images 118. In some implementations, constraints relating to the robotic manipulator 104 or to the item 106, or physics-based constraints, may prevent use of the robotic manipulator 104 to simulate the same points of contact 110. A configuration 102 including other points of contact 110 and associated force vectors 112, suitable for use by the robotic manipulator 104, may be determined from the model. The determined configuration 102 may correspond to the constraints of the robotic manipulator 104 and the item 106.

The configuration generation module 132 may produce one or more configurations 102 based on the image(s) 118, sensor data 120, constraint data 130, and item data 134. The configuration(s) 102 may be provided to the robotic manipulator(s) 104 for interacting with items 106. When multiple possible configurations 102 for interacting with an item 106 are determined, the configuration generation module 132 or the robotic manipulator(s) 104 may determine which of the multiple configurations 102 will result in the most stable manipulation of the item 106 without causing damage thereto. For example, a robotic manipulator 104 or a server 122 in communication therewith may determine a current location of the item 106. In some implementations, a first configuration 102 may be determined to be more suitable for use at a first location, while a second configuration 102 may be more suitable for use at a second location. In other implementations, a robotic manipulator 104 or a server 122 in communication therewith may determine an orientation of the item 106. A first configuration 102 may be more suitable for contacting the item 106 in a first orientation, while a second configuration 102 may be more suitable for contacting the item 106 in a second orientation.

When a request from a computing device to retrieve or stow an item 106 is received by the server(s) 122, the robotic manipulator(s) 104, or other computing device(s) in communication therewith, location data 136 in the server(s) 122 relating to the location of the item 106 may be accessed. In some implementations, one or more robotic manipulators 104 may be moved into association with the item 106 or a container containing the item 106 to enable the robotic manipulator(s) 104 to interact with the item 106. In other implementations, the item 106 or the container containing the item 106 may be moved to a distance from the robotic manipulator(s) 104 suitable for interaction therewith. When the robotic manipulator(s) 104 and the item 106 are positioned relative to one another, the robotic manipulator(s) 104 may be used to contact the item at the point(s) of contact 110 determined by the configuration 102 and to apply forces corresponding to the force vectors 112 of the configuration 102. In some implementations, the robotic manipulator(s) 104 may include one or more cameras 116 or similar sensors 114 usable to determine the location of the item 106 within a container or similar location. While FIG. 1 depicts the item 106 as an object having the shape of a rectangular prism, which may represent a box, crate, or similar packaging materials, configurations 102 may be determined for any manner of item 106, having any shape, dimensions, weight, weight distribution, and so forth.

In some implementations, the location data 136 may be used by the constraint module 128 to render one or more configurations 102 unusable. For example, the location data 136 may indicate that an item 106 is positioned at a location inaccessible to the robotic manipulator(s) 104. The location data 136 may also indicate the item 106 is positioned among other objects or containers in a manner that provides insufficient clearance for passage of the robotic manipulator(s) 104. In circumstances where constraints prevent use of the robotic manipulator(s) 104 to retrieve or store an item 106, an indication may be provided to one or more devices associated with human operators 108 to facilitate performance of the operation by a human operator 108.

Figure 2:
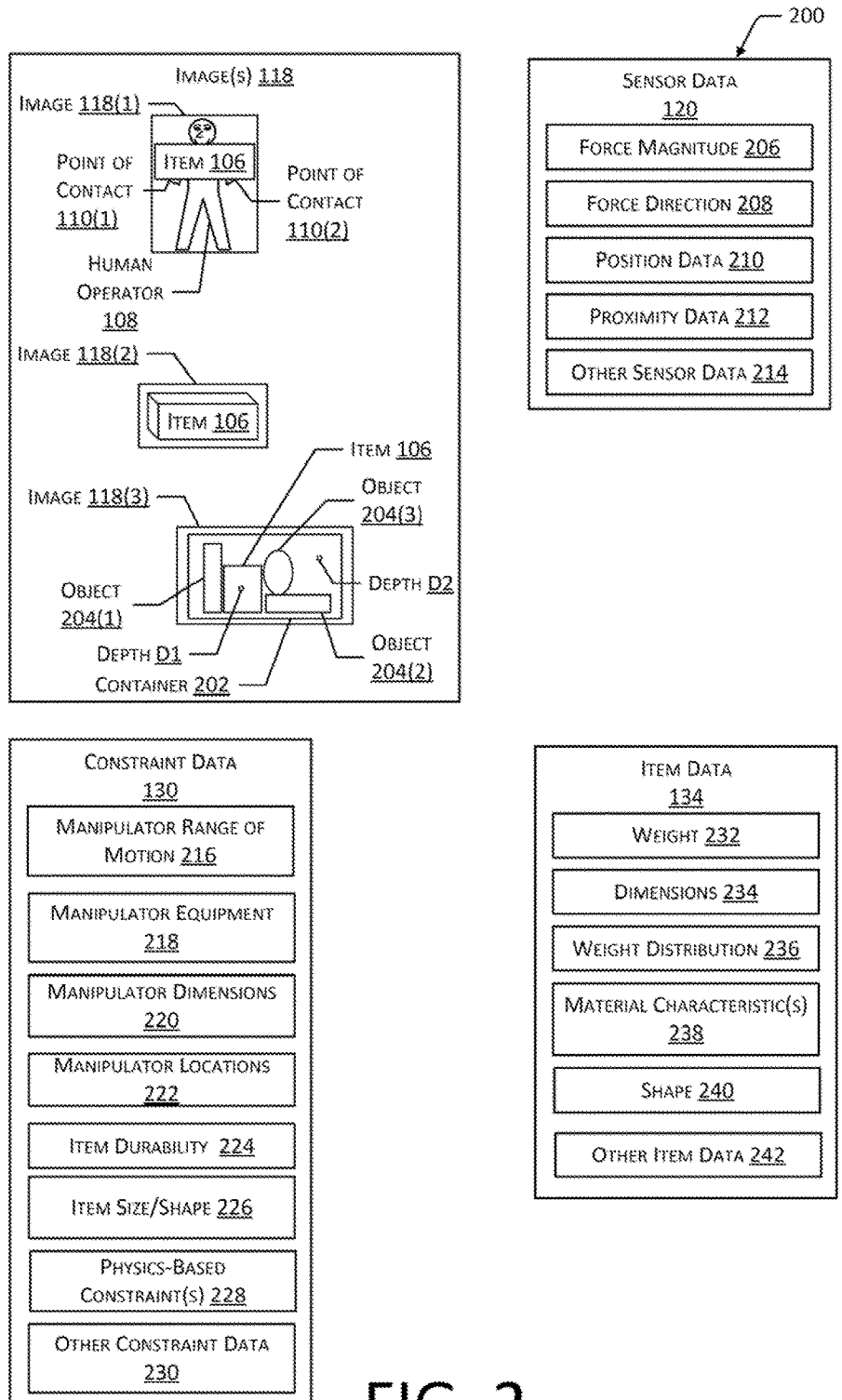
FIG. 2 is a block diagram illustrating examples of images, sensor data, constraint data, and item data.

FIG. 2 is a block diagram 200 illustrating example implementations of images 118, sensor data 120, constraint data 130, and item data 134 that may be used with the system 100 shown in FIG. 1.

One or more images 118 may be acquired using cameras 116 or other types of sensors 114. The image processing module 124 may process received images 118 to determine points of contact 110 and force vector(s) 112 applied by a human operator 108 to an item 106. Images 118 may also be processed to determine characteristics of the item 106 and one or more constraints that may limit the configurations 102 used by a robotic manipulator 104 to manipulate an item 106.

A first image 118(1) is shown depicting a human operator 108 gripping and lifting an item 106. A first point of contact 110(1) and a second point of contact 110(2) between the hands of the human operator 108 and the item 106 are shown in the image 118(1). Processing of the first image 118(1) by the image processing module 124 may determine one or more of the following: the depicted points of contact 110, other points of contact 110 not visible in the image 118(1) but able to be determined from other depicted items such as the pose of the human operator 108, one or more forces applied by the human operator 108 to the item 106, or one or more characteristics of the item 106. For example, the pose of the body of the human operator 108 may be used to determine a possible weight range or an approximate weight of the item 106 (e.g., "heavy," "not heavy") and forces applied by the human operator 108 thereto. The relative sizes of the item 106 and the human operator 108 may be used to determine approximate dimensions of the item 106 or of the human operator 108. One or more other objects visible in the first image 118(1) may enable determination of the location of the human operator 108 and item 106 at the time the image 118(1) was generated. In some implementations, the constraint module 128 may determine one or more constraints based on the depicted human operator 108 or item 106. For example, certain points of contact 110 or force vectors 112 determined from the first image 118(1) may be unsuitable for performance by a robotic manipulator 104.

A second image 118(2) is shown depicting the item 106 in a form in which it may be stowed. For example, the depicted item 106 may be packaged in a box, crate, or similar container. Because most items 106 are typically stowed in a packaged form, an image 118 depicting an item 106 in the form in which it was stowed may facilitate locating the item 106 within a container or other location, such as when using cameras other sensors associated with a robotic manipulator 104. An image 118 depicting the item 106 in the form in which it was stowed may also assist a human operator 108 in locating the item 106 when a robotic manipulator 104 is unable to access the item 106. Additionally, the image processing module 124 may determine one or more characteristics of the item 106 from the second image 118(2), including the shape, dimensions, weight, weight distribution, or materials of an item 106. In some implementations, the constraint module 128 may determine one or more constraints based on one or more characteristics of the item 106. For example, a robotic manipulator 104 may be unsuitable for handling a fragile or irregularly-shaped item 106. The shape or fragility of an item 106 may be determined from item data 134 associated with the item 106, sensor data 120 or images 118 associated with the item 106, and so forth.

A third image 118(3) is shown depicting the item 106 stowed within a container 202. The container 202 is also shown containing a first object 204(1), a second object 204(2), and a third object 204(3). Objects 204 within the container 202 may include other items 106, debris, protrusions or other structural portions of the container 202, and so forth. The image processing module 124 may use the third image 118(3) to determine the location of the item 106 relative to the objects 204 and relative to the walls, floor, and ceiling of the container 202. In some implementations, a depth or range camera 116 may be used to determine a depth of the container 202 at one or more points by determining the distance of the item 106, one or more objects 204, or a surface of the container 202 from the camera 116. For example, the third image 118(3) is shown including a determined depth D1 at a first point in the container 202 aligned with the item 106. The depth D1 may thereby indicate a distance between the camera 116 and the item 106. A second determined depth D2 at a second point in the container 202 is also shown. The second depth D2 is aligned with the far surface of the container 202 and may be used to determine the total depth of the container 202. In some implementations, the depth D1 associated with the item 106 and the depth D2 associated with the container 202 may be used to determine a height of the item 106. An image 118(3) depicting the container 202 containing the item 106, illustrating where the item 106 is stored relative to other objects 204 and the surfaces of the container 202 may facilitate locating of the item 106 by a robotic manipulator 104. An image 118 depicting the container 202 and the contents thereof in the form in which it was stowed may also assist a human operator 108 in locating the item 106 when a robotic manipulator 104 is unable to access the item 106. In some implementations, the constraint module 128 may determine one or more constraints based on the location, orientation, or placement of the item 106 within the container 202. For example, the position of other objects 204 or the surfaces of the container 202 may prevent passage of a portion of the robotic manipulator 104 necessary to engage the item 106.

Sensor data 120 may include data received from one or more types of sensors 114. Any portion of a facility, human operator 108, item 106, manual manipulator used by a human operator 108, container 202, or other object 204 stowed in association with an item 106 may have one or more sensors 114 associated therewith. Sensors 114 may include force sensors, which may be used to determine characteristics of one or more forces applied to an item 106. Sensors 114 may also include position sensors, which may be used to determine one or more of: the location of one or more portions of the body of a human operator 108 relative to an item 106 or the location of the item 106 relative to the human operator 108 or to other structures or objects 204.

Sensor data 120 may include one or more force magnitudes 206, which may represent the intensity of a force applied to an item 106 when a human operator 108 pushes, pulls, lifts, grips, or otherwise contacts the item 106. A force magnitude 206 may be measured by one or more load cells, strain gauges, transducers, force sensitive resistors, pressure sensors, touch sensors, or other types of force sensors associated with a human operator 108, item 106, or manual manipulator used by a human operator 108. In other implementations, force magnitude 206 may be determined from one or more images 118. For example, the intensity with which a human operator 108 is applying a force may be determined from an image 118 depicting a pose of the body the human operator 108, visible deformation in the body of the human operator 108 or the item 106, and so forth.

Sensor data 120 may further include one or more force directions 208. The direction of one or more forces applied to an item 106 may be measured using force sensors associated with the item 106, a human operator 108 manipulating the item 106, a manual manipulator used by the human operator 108. In some implementations, force directions 208 may be determined using one or more position sensors. For example, position sensors may determine a direction in which a hand or other portion of the body of a human operator 108 is moving when manipulating an item 106. In other implementations, force directions 208 may be determined from one or more images 118. For example, a direction in which a human operator 108 is applying a force to an item 106 may be determined from an image 118 depicting a pose of the body of the human operator 108 or multiple images 118 depicting movement of the human operator 108. A force magnitude 206 and force direction 208 associated with a force together define a force vector 112.

Sensor data 120 may also include position data 210. Position data 210 may include data measured by one or more position sensors regarding the position of one or more portions of a human operator 108 or an item 106. For example, the specific position of each finger of a human operator 108 may be measured by associating position sensors therewith. In one implementation, a human operator 108 may wear a glove or similar clothing article having one or more sensors 114 integrated therewith. Any portion of the body of a human operator 108, an item 106, or a manual manipulator used by a human operator 108 may have one or more proximity sensors, touch sensors, RFID or NFC sensors, orientation sensors, 3D sensors, location sensors, or another type of position sensor associated therewith, such that position of the human operator 108 relative to the item 106 may be determined.

Sensor data 120 may also include proximity data 212. Proximity data 212 may be measured by one or more proximity sensors associated with the human operator 108, the item 106, a container 202 configured to contain the item 106, one or more portions of a facility, and so forth. For example, proximity sensors may be used to determine whether a robotic manipulator 104 is positioned relative to an item 106 in a manner that will enable the robotic manipulator 104 to contact and manipulate the item 106. Proximity sensors may be used to detect the presence of items 106 and robotic manipulators 104 within various locations of a facility.

Other sensor data 214 may include data received from other types of sensors 114, such as light or temperature sensors, biomedical sensors, location sensors, and so forth. For example, a robotic manipulator 104 may be inoperable at certain temperature ranges or at certain locations determined using location sensors.

Constraint data 130 may include one or more truth sets or similar types of data relating to characteristics of a robotic manipulator 104, one or more items 106, a container 202, a facility, rule sets (e.g., physics-based constraints) applicable to multiple environments, and so forth. For example, a robotic manipulator 104 may have a limited range of motion or may be unsuitable for handling certain types of items 106. In other implementations, the dimensions of at least a portion of a robotic manipulator 104 may exceed available clearance in a location, such that the robotic manipulator 104 may not be used in that location. In still other implementations, one or more characteristics of an item 106, such as fragility, may render the item 106 unsuitable for manipulation by a robotic manipulator 104. A constraint module 128 may determine one or more constraints from the constraint data 130. Determination of constraints may cause modification of one or more determined configurations 102, deletion of certain configurations 102, and so forth.

Constraint data 130 may include a manipulator range of motion 216. While some robotic manipulators 104 may have a form and a range of motion comparable to that of a human hand, in some implementations, a robotic manipulator 104 may have fewer than five appendages or may have a shorter range of motion than that of a human hand. Constraints determined from the manipulator range of motion 216 may be used to modify or delete configurations 102 that would require a robotic manipulator 104 to move in a manner that exceeds the functional capabilities of the robotic manipulator 104. Constraints determined from the manipulator range of motion 216 may further be used to generate configurations 102 suitable for manipulating an item 106, using the item data 134 and data obtained from images 118 depicting interactions between human operators 108 and the item 106.

The constraint data 130 may include manipulator equipment 218. For example, robotic manipulators 104 may include one or more of the following: an anthropomorphic hand, one or more finger-like digits, a movable platform member, a vacuum-based gripping member, a suction-based gripping member, an adhesive-based gripping member, a friction-based gripping member, a ferromagnetic-based gripping member, and so forth. Constraints determined from the manipulator equipment 218 may be used to modify or delete configurations 102 that would require a robotic manipulator 104 to contact an item 106 in a manner that is not possible based on the gripping elements associated with the robotic manipulator 104. Constraints determined from the manipulator equipment 218 may further be used to generate configurations 102 suitable for manipulating an item 106.

The constraint data 130 may further include manipulator dimensions 220. For example, the size of one or more portions of a robotic manipulator 104, such as an arm and gripping portion thereof, may be used to determine whether all or a portion of the robotic manipulator 104 may pass within a clearance between an item 106 and surfaces of a container 202 or between the item 106 and an adjacent object 204. Constraints determined from the manipulator dimensions 220 may be used to modify or delete configurations 102 that would require passage of the robotic manipulator 204 in areas with insufficient clearance.

Constraint data 130 may also include one or more manipulator locations 222. For example, one or more locations within a facility may be inaccessible to robotic manipulators 104. Configurations 102 for retrieving items 106 stored in such locations may be modified such that passage of the robotic manipulator 104 through the location(s) is not required. In some implementations, an indication of such a constraint that renders use of a robotic manipulator 104 impossible may be provided to a device associated with a human operator 108 to facilitate completion of the operation by a human.

Constraint data 130 may include item durability 224. The durability of an item 106 may be determined from the item data 134, from one or more images 118 depicting the item 106, or from one or more sensors 114. For example, certain types of items 106, such as items 106 formed from fragile materials, may be unsuitable for manipulation by a robotic manipulator 104. In some implementations, one or more indications regarding such a constraint may be provided to a device associated with a human operator 108 to facilitate completion of the operation by a human. In other implementations, constraints associated with item durability 224 may be used to generate configurations 102 for use with a robotic manipulator 104. For example, constraints associated with item durability 224 may affect the maximum force magnitude 206 that may be applied to at least a portion of an item 106.

Constraint data 130 may also include one or more item sizes/shapes 226. In some implementations, items 106 having certain shapes, such as irregular shapes, or certain dimensions may be determined to be unsuitable for manipulation by a robotic manipulator 104. For example, an item 106 that is too small to be gripped by a robotic manipulator 104 would be unsuitable for use therewith. In some implementations, one or more indications regarding such a constraint may be provided to a device associated with a human operator 108 to facilitate completion of the operation by a human. In other implementations, constraints relating to item sizes/shapes 226 may be used to generate configurations 102 suitable for use interacting with the item 106.

Constraint data 130 may include one or more physics-based constraint(s) 228. For example, one or more configurations 102 that may be executed using one or more robotic manipulators 104 may result in dropping of the item 106 or damage to the item 106 or robotic manipulator(s) 104 due to physics-based limitations. Continuing the example, a determined set of points of contact 110 may be usable by a robotic manipulator 104 without damaging an item 106, but transport of the item 106 using the points of contact 110 may cause the item to become unstable. As such, physics-based constraints 228 may be used to modify or delete one or more configurations 102 that are not possible to be executed successfully. For example, responsive to a determination of a physics-based constraint 228, a configuration 102 may be modified to increase the surface area of one or more points of contact 110 between a robotic manipulator 104 and an item 106, to space the points of contact 110 between a robotic manipulator 104 and an item 106 more widely or more closely, and so forth.

Other constraint data 230 may include constraints relating to characteristics of a facility that may limit possible uses or movement of robotic manipulators 104, characteristics of containers 202 containing items 106, characteristics of other objects 204 that may limit possible uses or movement of robotic manipulators 104, a maximum weight of an item 106 that may be manipulated by the robotic manipulator 104, and so forth.

Item data 134 may include one or more physical characteristics associated with an item 106. The item data 134 may be used to determine suitable points of contact 110 and force vectors 112 for manipulating the item 106. Item data 134 may also be used to determine whether contacting certain portions of the item 104 or applying a force in excess of a certain force magnitude 206 may damage the item 106.

Item data 134 may include the weight 232 of an item 106. The weight 232 of the item 106 may be determined by weighing the item 106 prior to stowage or retrieval thereof. In some implementations, the weight 232 of the item 106 may be known or provided by a manufacturer or vendor thereof. In other implementations, the weight 232 of the item 106 may be determined from one or more images 118. For example, the pose of a human operator 108 carrying an item 106, depicted in an image 118, may enable a possible weight range or approximate weights 232 of the item 106 to be determined. In some implementations, an item 106 may be classified as "light" or "heavy," based on the pose of a human operator 108. For example, an item 106 held by a human operator 108 in a single hand, with the human operator's 108 feet beneath the shoulders may be determined to be light. An item 106 held by a human operator 108 with two hands, braced against the human operator's 108 arms and torso, while the human operator's 108 legs are bent may be determined to be heavy. The weight 232 of the item 106 may be used to determine forces necessary to lift and move the item 106 by the robotic manipulator 104. In some implementations, the constraint data 130 may include a maximum weight 232 for an item 106 that may be manipulated by the robotic manipulator 104.

The item data 134 may include dimensions 234 of the item 106. Dimensions 234 may include length, width, height, depth, diameter, circumference, surface area, and so forth. Dimensions 234 of an item 106 may be determined by measuring the item 106 prior to stowage or retrieval thereof. In some implementations, the dimensions 234 of the item 106 may be known or provided by a manufacturer or vendor thereof. In other implementations, the dimensions 234 of the item 106 may be determined from one or more images 118 in which the item 106 is depicted. The dimensions 234 of the item 106 may be used to determine points of contact 110 that may be used to support the item 106 during movement thereof by the robotic manipulator 104.

The item data 134 may further include a weight distribution 236 associated with the item 106. For example, depending on the materials from which the item 106 is formed, the dimensions 234 or shape of the item 106, and so forth, the weight 232 of the item 106 may be distributed across its dimensions 234 in a manner that a center of mass for the item 106 may be determined. The weight distribution 236 may be used to determine points of contact 110 and force vectors 112 that may be used to balance the item 106 during movement thereof by the robotic manipulator 104.

The item data 134 may also include material characteristics 238 of the item 106. Material characteristics 238 may include the materials from which one or more portions of the item 106 are formed, the durability (e.g., durometer measurement) or fragility of one or more portions of the item 106, the flexibility or compressibility of one or more portions of the item 106, and so forth. Material characteristics 238 may also facilitate determination of the weight distribution 236, based on the location, weight, and density of one or more materials within the item 106. The material characteristics 238 of an item 106 may determine one or more points of contact 110 and associated force vectors 112 that may be applied by a robotic manipulator 104 without damaging an item. In some implementations, the material characteristics 238 may be used to determine whether the fragility or flexibility of an item 106 may prevent manipulation thereof by a robotic manipulator 104.

The item data 134 may include a shape 240 corresponding to the item 106. Shapes 240 of items 106 may include cuboids, spheroids, toroids, regular polygonal prisms, planar shapes, irregular planar and polygonal shapes, and so forth. The shape 240 of an item 106 may facilitate determination of the weight distribution 236 thereof. In some implementations, the shape 240 of an item 106 may be used to determine whether the item 106 is unsuitable for manipulation by a robotic manipulator 104. For example, an item 106 having an irregular shape 240 with multiple protrusions may become damaged (e.g., crushed, dented, or otherwise broken) if handled by a robotic manipulator 104. The shape 240 of an item 106 may facilitate determination of one or more points of contact 110 suitable for supporting the item 106 during manipulation thereof by a robotic manipulator 104.

Other item data 242 may include other physical characteristics of an item 106, such as an item state (e.g., solid, liquid, gas) of one or more portions of an item 106, an item temperature, and so forth. Other item data 242 may further include whether the materials from which an item 106 is formed may be manipulated using suction-based, ferromagnetic-based, or friction-based gripping elements, the characteristics of an exterior surface of an item 106, and so forth.

Figure 3:
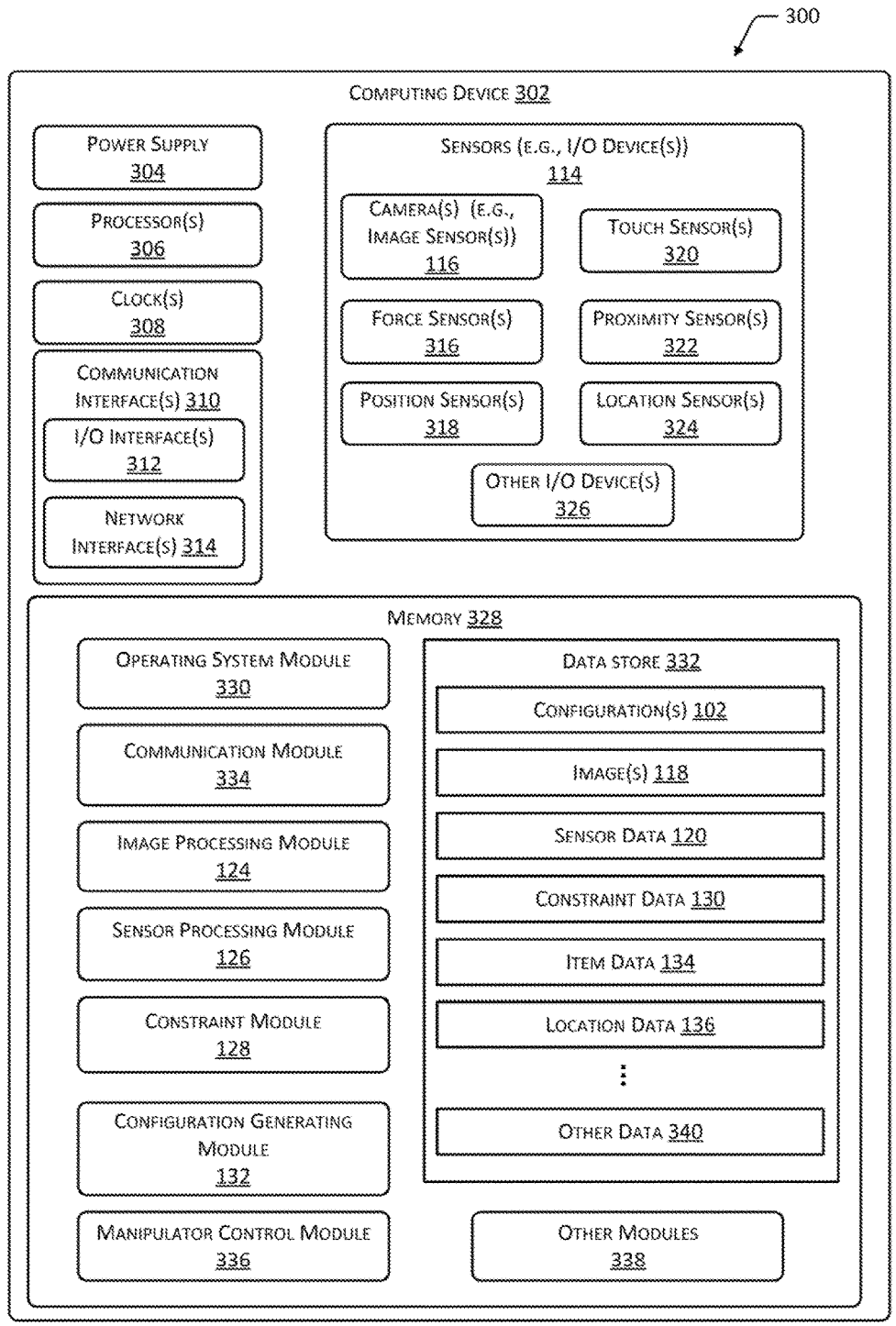
FIG. 3 is a block diagram illustrating a computing device within the scope of the present disclosure.

FIG. 3 illustrates a block diagram 300 of a computing device 302 configured to support operation of the system 100. The computing device 302 may include one or more servers 122, one or more robotic manipulators 104, one or more cameras 116 or other types of sensors 114, or other computing devices 302 in communication therewith. Computing devices 302 may further include computer-readable storage media (CRSM) or libraries accessible to the server(s) 122, robotic manipulator(s) 104, sensors 114, or other computing devices 302.

One or more power supplies 304 may be configured to provide electrical power suitable for operating the components in the computing device 302. In some implementations, the power supply 304 may include a rechargeable battery, fuel cell, photovoltaic cell, power conditioning circuitry, and so forth.

The computing device 302 may include one or more hardware processors 306 (processors) configured to execute one or more stored instructions. The processor(s) 306 may include one or more cores. The processor(s) 306 may be application processing units (APUs), digital signal processors (DSPs), or graphics processing units (GPUs). One or more clocks 308 may provide information indicative of date, time, ticks, and so forth. For example, the processor(s) 306 may use data from the clock 308 to generate a timestamp, trigger a preprogrammed action, and so forth.

The computing device 302 may include one or more communication interfaces 310, such as input/output (I/O) interfaces 312, network interfaces 314, and so forth. The communication interfaces 310 may enable the computing device 302, or components thereof, to communicate with other devices or components. The I/O interfaces 312 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 312 may couple to one or more sensors 114 or other types of I/O devices. I/O devices may include any manner of input device or output device associated with the server(s) 122, robotic manipulator(s) 104, sensors 114, or other computing device 302. For example, the sensors 114 may include cameras 116 or other types of image sensors, one or more force sensors 316, position sensors 318, touch sensors 320, proximity sensors 322, or location sensors 324. Other I/O devices 326 may include other types of sensors 114, such as light sensors, 3D sensors, temperature sensors, and so forth. Other I/O devices 326 may include devices used to interact with computing devices 302, such as buttons, keyboards, mouse devices, scanners, displays, haptic devices, printers, microphones, speakers and so forth. In some implementations, sensors 114 and I/O devices may be physically incorporated with the computing device 302 or may be externally placed.

The network interfaces 314 may be configured to provide communications between the computing device 302 and other devices, such as the sensors 114, I/O devices, routers, access points, and so forth. The network interfaces 314 may include devices configured to couple to one or more networks including LANs, wireless LANs, WANs, wireless WANs, and so forth. For example, the network interfaces 314 may include devices compatible with Ethernet, Wi-Fi®, Bluetooth®, ZigBee®, Z-Wave, 3G, 4G, LTE, and so forth.

The computing device 302 may include one or more busses or other internal communications hardware or software that allows for the transfer of data between the various modules and components of the computing device 302.

As shown in FIG. 3, the computing device 302 may include one or more memories 328. The memory 328 may include one or more CRSM. The CRSM may be any one or more of an electronic storage medium, a magnetic storage medium, an optical storage medium, a quantum storage medium, a mechanical computer storage medium, and so forth. The memory 328 may provide storage of computer-readable instructions, data structures, program modules, and other data for the operation of the computing device 302. A few example modules are shown stored in the memory 328, although the same functionality may alternatively be implemented in hardware, firmware, or as a system on a chip (SoC).

The memory 328 may include one or more operating system (OS) modules 330. The OS module 330 may be configured to manage hardware resource devices such as the I/O interfaces 312, the network interfaces 314, the sensors 114, one or more I/O devices, and to provide various services to applications or modules executing on the processors 306. The OS module 330 may implement a variant of the FreeBSD™ operating system as promulgated by the FreeBSD Project; UNIX™ or a UNIX-like operating system; a variation of the Linux™ operating system as promulgated by Linus Torvalds; the Windows® operating system from Microsoft Corporation of Redmond, Wash., USA; or other operating systems.

A data store 332 and one or more of the following modules may also be stored in the memory 328. The modules may be executed as foreground applications, background tasks, daemons, and so forth. The data store 332 may use a flat file, database, linked list, tree, executable code, script, or other data structure to store information. In some implementations, the data store 332 or a portion of the data store 332 may be distributed across one or more other devices including the computing devices 302, network attached storage devices, and so forth.

A communication module 334 may be configured to establish communications with one or more other computing devices 302, such the server(s) 122, robotic manipulator(s) 104, sensors 114, one or more remote CRSM, and so forth. The communications may be authenticated, encrypted, and so forth.

The memory 328 may store the image processing module 124. The image processing module 124 may access one or more images 118 received from cameras 116 or other image sensors and determine points of contact 110, force vectors 112, constraints, and so forth, from the image(s) 118. As described previously, image processing may be performed using the OpenCV library, Willow Garage, Itseez, or other image processing tools. In some implementations, image processing may include segmenting images 118 by sampling portions thereof and computing one or more Histograms of Oriented Gradients (HoG) over different color channels. The size of the image portions sampled may be determined by the dimensions 234 of all or a portion of an item 106, container 202, or human operator 108.

The memory 328 may also store the sensor processing module 126. The sensor processing module 126 may access sensor data 120 received from one or more sensors 114. For example, the sensor processing module 126 may convert measurements received from one or more force sensors 316 to one or more of a point of contact 110, a force magnitude 206, a force direction 208, or a force vector 112. Continuing the example, the sensor processing module 126 may convert measurements received from one or more position sensors 318 or other types of sensors 114 to data usable to determine a point of contact 110, a force vector 112, and so forth.

The memory 328 may further store the constraint module 128. The constraint module 128 may access constraint data 130, which may include limitations relating to robotic manipulator(s) 104, item(s) 106, containers 202, facilities, other objects 204 proximate to the item 106, physics-based constraints 228, and so forth. Based on one or more of the images 118, sensor data 120, constraint data 130, item data 134, or location data 136, the constraint module 128 may determine one or more constraints regarding use of the robotic manipulator(s) 104 with one or more items 106. Determined constraints may be used to modify or delete one or more configurations 102. For example, a robotic manipulator 104 lacking a number of appendages sufficient to duplicate a grip of a human operator 108 (e.g., having five fingers) may execute a configuration 102 having a smaller number of points of contact 110, spaced in a manner to simulate the grip of a five-fingered hand of a human operator 108. The force vectors 112 applied at each point of contact 110 may be greater than those applied by a human operator 108 due to the smaller number of points of contact 110 present in the configuration 102 for the robotic manipulator 104. In another example, the constraints determined for a robotic manipulator 104 having a gripping mechanism unable to grip compressible or flexible items 106 may prevent execution of any configuration 102 for gripping a flexible or compressible item 106 by the robotic manipulator 104. In some implementations, an indication may be provided to a device associated with a human operator 108 to facilitate completion of a stowage or retrieval operation of a flexible or compressible item 106 by a human.

The memory 328 may also store the configuration generating module 132. The configuration generating module 132 may access data generated by the image processing module 124 from the one or more images 118, sensor data 120 processed by the sensor processing module 126, one or more constraints determined by the constraint module 128 using the constraint data 130, and the item data 134. The accessed data may be used to determine one or more configurations 102 by which the robotic manipulator(s) 104 may interact with one or more items 106.

Using points of contact 110 and force vectors 112 determined from the images 118 and sensor data 120, the configuration generating module 132 may determine an initial set of configurations 102 for execution by the robotic manipulator 104. Constraints determined from the constraint data 130 and the item data 134 may be used to determine configurations 102 that may not be possible to execute using the robotic manipulator 104. Such configurations 102 may be modified or deleted, such that the resulting set of configurations 102, modified by one or more constraints, may be used by the robotic manipulator 104 to successfully interact with the item 106. The images 118, sensor data 120, and item data 134 may further be used to generate a model of interactions between an item 106 and a robotic manipulator 104. The constraint data 130 may be used to determine one or more configurations 102 of the robotic manipulator 104 suitable for use with the item 106. For example, the points of contact 110 and force vectors 112 applied to an item 106 by human operators 108 may be unusable by a robotic manipulator 104. However, the images 118 and sensor data 120 associated with the interactions between the human operators 108 and the item 106 may be used to determine characteristics of the item 106, such as a shape 240, dimensions 234, weight 232, weight distribution 236, and material characteristics 238. From these characteristics and the constraint data 130, the configuration generating module 132 may determine configurations 102 suitable for use by the robotic manipulator 104 that may differ from the points of contact 110 and force vectors 112 applied to the item 106 by a human operator 108.

In some implementations, the location data 136 may be used to determine one or more constraints that may be used to modify or prevent execution of one or more configurations 102. For example, one or more locations in which an item 106 is stored may be inaccessible to a robotic manipulator 104. In some implementations, a first configuration 102 may be more suitable for use at a first location such as a mostly-empty shelf, while a second configuration 102 is more suitable for use at a second location such as a mostly-full crate.

A manipulator control module 336 is also shown in the memory 328. The manipulator control module 336 may be used to access and control one or more robotic manipulators 104 responsive to requests to store, retrieve, or otherwise move or manipulate one or more items 106. For example, the manipulator control module 336 may access a request to move an item 106 received from another computing device 302. Responsive to this request, the manipulator control module 336 may access location data 136 in the data store 332 corresponding to the item 106 to determine a current location of the item 106. In some implementations, the location data 136 may include a destination location for the item 106. The manipulator control module 336 may cause movement of the robotic manipulator 104 to the location of the item 106, movement of the item 106 to the location of the robotic manipulator 104, or movement of both the robotic manipulator 104 and the item 106 to positions configured to enable contacting the item 106 with the robotic manipulator 104.

The manipulator control module 336 may cause the robotic manipulator 104 to contact the item 106 using the point(s) of contact 110 and force vector(s) 112 of a determined configuration 102. In some implementations, an image 118 of the current location of the item 106 may be accessed, and one configuration 102 of a plurality of configurations 102 may be determined for use based on the current location of the item 106. For example, the orientation of the item 106 within a container 202 or the position of the item 106 relative to other objects 204 may cause use of one configuration 102 to be suitable, while one or more other configurations 102 may be rendered impossible or less likely to successfully manipulate the item 106. In some implementations, one or more configurations 102 may include a reference position of the item 106. For example, a configuration 102 may include points of contact 110 or force vectors 112 that may be applied to the item 106 when it is upright. The manipulator control module 336 may determine the orientation of an item 106, such as through use of one or more images 118 thereof. The manipulator control module 336 may also position one or more of the robotic manipulator 104 or the item 106 such that the item 106 is placed in the reference position relative to the robotic manipulator 104. The configuration 102 may then be used to contact the item 106 using the robotic manipulator 104.

After contacting an item 106 using a robotic manipulator 104, such as by gripping, lifting, supporting, or otherwise moving the item 106, the manipulator control module 336 may cause the robotic manipulator 104 to move the item 106 from a first location to a second location. For example, a robotic manipulator 104 may be used to move an item 106 from a receiving area of a facility to a location within an interior of a container 202. A robotic manipulator 104 may be used to move an item 106 from a container 202 or other storage area of a facility to a location suitable for transport. In some implementations, a robotic manipulator 104 may be used to move one or more items 106 or containers 202 from a first location within a facility to a second location within the facility.

Other modules 338 may also be present in the memory 328. For example, encryption modules may be used to encrypt and decrypt communications between computing devices 302. User interface modules may be used to enable users to interact with computing devices 302, to modify data in the data store 332, to input data or parameters regarding items 106, robotic manipulators 104, storage containers 202, and so forth. Output generation modules may be used to provide confirmations, indications of completed processes, indications of processes to be performed by human operators 108, and so forth. Other data 340 may be stored in the data store 332 and may include encryption data, layouts of all or a portion of a facility, data regarding containers 202, data regarding operating conditions and parameters of robotic manipulators 104, and so forth.

In some implementations, different computing devices 302 may have different capabilities or capacities. For example, the server(s) 122 may have significantly more processor 306 capability and memory 328 capacity compared to the robotic manipulator(s) 104 or sensors 114.

Figure 4:
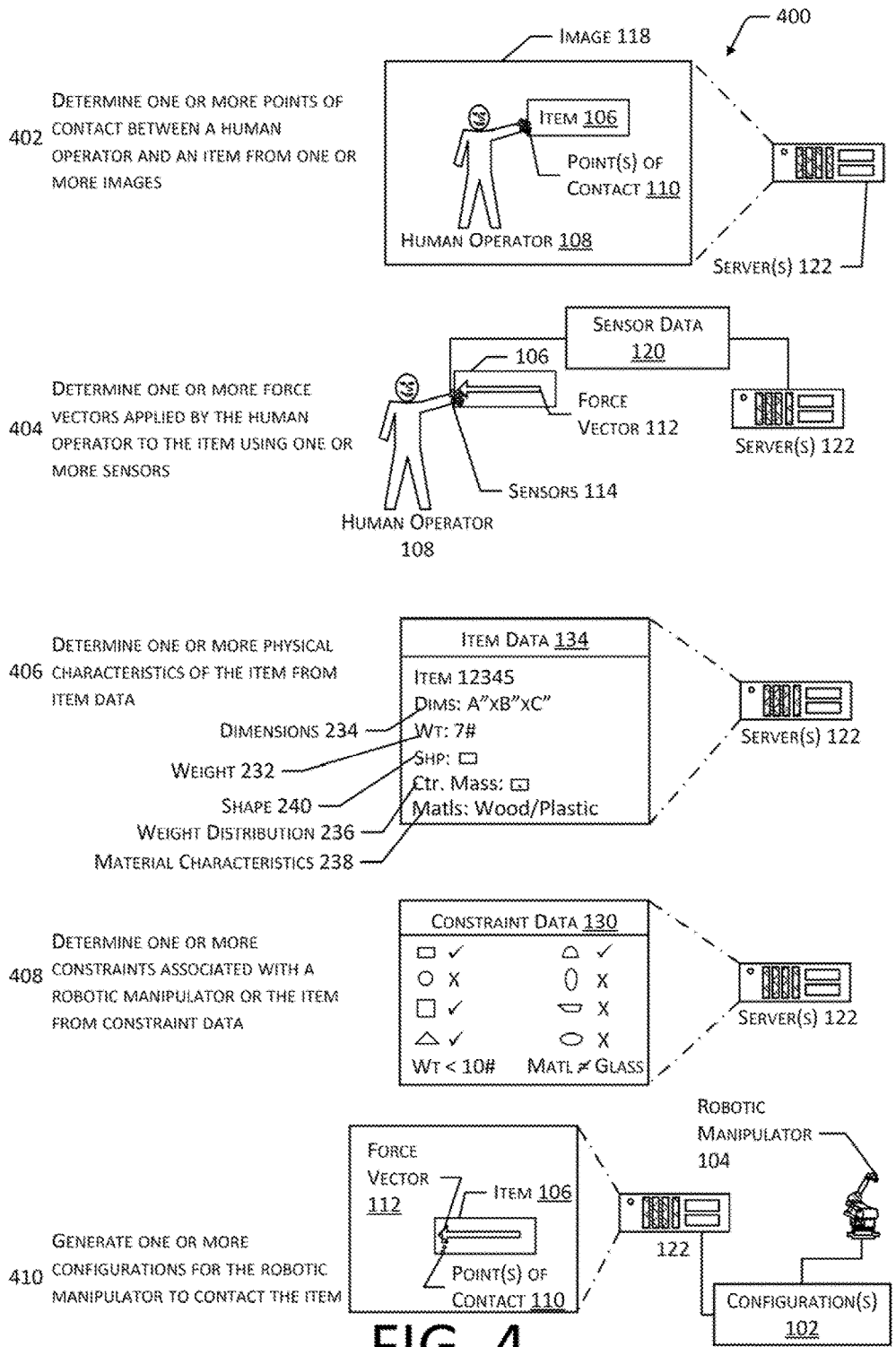
FIG. 4 is a scenario for generating one or more configurations for a robotic manipulator to contact an item using sensor data obtained from a human operator.

FIG. 4 depicts a scenario 400 for generating one or more configurations 102 for a robotic manipulator 104 to contact an item 106. The configurations 102 may be generated using data obtained from a human operator 108.

At 402, one or more points of contact 110 between a human operator 108 and an item 106 may be determined from one or more images 118. For example, one or more servers 122 or other computing devices 302 may access one or more stored images 118. Alternatively, one or more images 118 may be received from a camera 116 or other types of image sensors. An image processing module 124 associated with the server(s) 122 or other computing devices 302 may determine one or more of the following: points of contact 110 between the body of the human operator 108 and the item 106, points of contact 110 between a manual manipulator used by the human operator 108 and the item 106, characteristics of the item 106 based on the pose of the human operator 108, characteristics of the item 106 based on the physical appearance of the item 106, one or more forces applied to the item 106 by the human operator 108, a location where the human operator 108 and item 106 were positioned at the time the image 118 was generated, and so forth.

At 404, one or more force vectors 112 applied by the human operator 108 to the item 106 may be determined using one or more sensors 114. For example, the hand or other body portion of the human operator 108, the item 106, or both the human operator 108 and the item 106 may be instrumented with one or more of the following: force sensors 316 or position sensors 318. The sensors 114 may determine the magnitude, the direction, or both the magnitude and direction of one or more forces applied by the human operator 108 to the item 106. Sensor data 120 generated by the sensors 114 may be provided to the server(s) 122 or other computing devices 302. A sensor processing module 126 may process the sensor data 120 to determine one or more force vectors 112 applied to the item 106. In some implementations, one or more force vectors 112 may be determined based on a rate of movement of the human operator 108 or the item 106. In other implementations, one or more possible force vectors 112 may be determined based on visible or measurable compression of a portion of the body of the human operator 108 or the item 106. One or more of the human operator 108 or the item 106 may be equipped with sensors 114 to facilitate measurement of such compression or deformation. Sensors 114 may also generate sensor data 120 that may be used to determine a current location of the human operator 108 or the item 106, proximity of the human operator 108 or item 106 to locations or objects 204 instrumented with proximity sensors 322, temperature, pressure, or humidity at the location of the human operator 108 or item 106, whether packaging of the item 106 has become opened or damaged, and so forth.

At 406, one or more physical characteristics of the item 106 may be determined from item data 134. Item data 134 may be stored in one or more servers 122 or other computing devices 302. In some implementations, physical characteristics of an item 106 may be determined and stored when an item 106 is received or stowed at a facility. For example, an item 106 may be weighed, measured, or otherwise analyzed prior to placement in a container 202. In other implementations, physical characteristics of an item 106, such as the weight 232, dimensions 234, material characteristics 238, and so forth, may be provided by a manufacturer or vendor associated with the item 106. In some implementations, characteristics of an item 106 may be determined from one or more images 118 that depict the item 106 or one or more sensors 114 associated with the item 106. For example, handling of an item 106 by a robotic manipulator 104 or a human operator 108 having sensors 114 associated therewith may be used to determine a weight 232, weight distribution 236, shape 240, material characteristics 238, or dimensions 234 of an item 106. Item data 134 may be used to determine one or more configurations 102 suitable for gripping, lifting, or otherwise manipulating the item 106. In the depicted scenario 400, the dimensions 234, weight 232, shape 240, weight distribution 236 (e.g., center of mass), and material characteristics 238 of the item 106 are depicted as item data 134.

At 408, one or more constraints associated with a robotic manipulator 104 or the item 106 may be determined from constraint data 130. For example, the server(s) 122 are shown accessing constraint data 130 from a data store 332 that includes eight possible shapes 240 of items 106. Four of the depicted shapes 240 may be suitable for manipulation by a robotic manipulator 104, while the other four of the depicted shapes 240 may be unsuitable for manipulation by the robotic manipulator 104. The depicted constraint data 130 also includes a limitation regarding a maximum weight 232 of the item 106 (e.g., less than ten pounds), and a restriction regarding the material characteristics 238 of the item 108 (e.g., the item may not be made from glass.) While the depicted scenario 400 includes constraint data 130 relating to the shape 240, weight 232, and material characteristics 238 of an item 106, constraints may also be determined based on characteristics of the robotic manipulator 104, the facility or other location, or physics-based constraints 228. For example, constraints may be based on the manipulator range of motion 216, the manipulator equipment 218, the manipulator dimensions 220, manipulator locations 222 that may be inaccessible to a robotic manipulator 104, item durability 224, one or more physics-based constraints 228, and so forth. In the depicted scenario 400, the shape 240 of the item 106 noted in the item data 134 is rectangular, the weight 232 of the item 106 is seven pounds, and the material characteristics 238 of the item 106 include use of wood and plastic. The constraint data 130 may indicate that items 106 having a rectangular shape 240, a weight 232 less than ten pounds, and materials other than glass are suitable for manipulation using a robotic manipulator 104.

At 410, one or more configurations 102 for the robotic manipulator 104 to contact the item 106 may be generated. Generated configurations 102 may be provided to one or more robotic manipulators 104 by the server(s) 122 or other computing devices 302. For example, the server(s) 122 or other computing devices 302 may use the determined point(s) of contact 110 and force vector(s) 112 to generate a corresponding set of point(s) of contact 110 and force vector(s) 112 usable by the robotic manipulator 104. The point(s) of contact 110 and force vector(s) 112 of the configuration 102 for the robotic manipulator 104 may not necessarily be identical to the point(s) of contact 110 and force vector(s) 112 used by the human operator 108. For example, a robotic manipulator 104 may lack a manipulator range of motion 216 comparable to the range of motion of the hand of a human operator 108. Similarly, a robotic manipulator 104 may lack manipulator equipment 218 similar in form and function to a human hand. Constraints relating to the functionality of the robotic manipulator 104 may be used to determine configuration 102 modifications to the points of contact 110 and force vectors 112 determined from the image 118 that may still successfully manipulate an item 106. In some implementations, constraint data 130 and a model of an item 106 determined from item data 134 and one or more images 118 may be used to generate configurations 102 having points of contact 110 and force vectors 112 that differ significantly from those used by human operators 108 to manipulate items 106.

Figure 5:
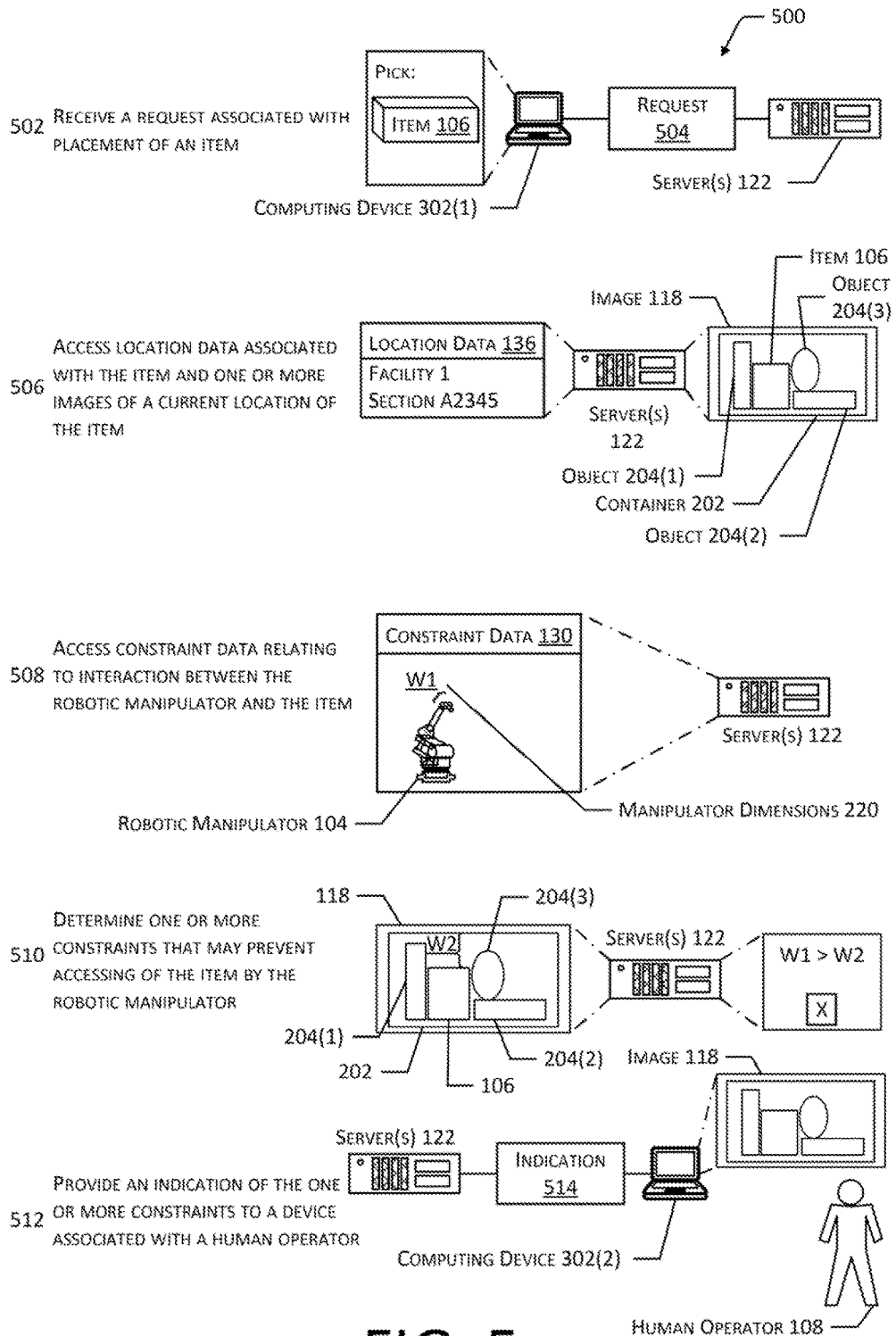
FIG. 5 is a scenario for determining one or more constraints that may prevent one or more robotic manipulators from accessing an item.

FIG. 5 is a scenario 500 for determining one or more constraints that may prevent a robotic manipulator 104 from accessing an item 106. At 502, a request 504 associated with placement of an item 106 may be received from a computing device 302. For example, a first computing device 302(1) is shown providing a request 504 to one or more server(s) 122. A request 504 may include instructions to store an item 106 at a storage location, such as within a container 202 at a facility. In other implementations, a request 504 may include instructions to retrieve a stored item 106, such as an item 106 currently stored within a container 202 at a facility. In the depicted scenario 500, the request 504 provided by the device 302(1) may be generated responsive to a user associated with the device 302(1) purchasing the item 106.

At 506, location data 136 associated with the item 106 and one or more images 118 of a current location of the item 106 may be accessed from the server 122. In the depicted scenario 500, the location data 136 includes an identification of a section within a facility where the item 106 may be stored. The section may correspond to a particular container 202 within the facility. In other implementations, location data 136 may include GPS coordinates, a map location, a physical address, a distance and direction relative to the device accessing the location data 136, and so forth. The server(s) 122 are depicted accessing an image 118 that depicts the item 106 within a container 202, such as a box, bin, crate, and so forth. Three other objects 204 are positioned adjacent to the item 106 within the container 202. While the container 202 is depicted having a rectangular shape, any manner of container 202 may be used. In some implementations, an item 106 may be stored at a location external to a container 202.

At 508, constraint data 130 relating to an interaction between a robotic manipulator 104 and the item 106 may be accessed. For example, the constraint data 130 may include limitations regarding a manipulator range of motion 216, manipulator equipment 218, manipulator dimensions 220, manipulator locations 222, and so forth, which may be inaccessible to a robotic manipulator 104. In other implementations, constraint data 130 relating to characteristics of the item 106 may be accessed by the server(s) 122. In the depicted scenario 500, the robotic manipulator 104 is shown having manipulator dimensions 220 ("W1") associated with the manipulating end used to contact items 106.

At 510, one or more constraints that may prevent the robotic manipulator 104 from accessing the item 106 may be determined. For example, a width ("W2") between the item 106 and a surface of the container 202 may be determined from the image 118. In some implementations, the image 118 may include depth information to facilitate determination of dimensions and distances using the image 118. For example, the image 118 may be acquired using a depth camera. In the depicted scenario 500, the width of the manipulator dimensions 220 ("W1") exceeds the width ("W2") between the item 106 and the surface of the container 202. As such, the robotic manipulator 104 may be unable to pass into the container 202 adjacent to the item 106 to grip or otherwise access or manipulate the item 106. As another example, the constraint data 130 may indicate that the portion of the item 106 that does not abut adjacent objects may include a fragile material, a degree of rigidity or compressibility, or a surface texture that would inhibit manipulation of the exposed portion of the item 106 by a robotic manipulator 104.

At 512, an indication 514 of the constraints preventing use of the robotic manipulator 104 may be provided to a device 506(2) associated with a human operator 108. In the depicted scenario 500, the indication 514 provided to the human operator 108 may include an image 118 of the item 106 as it was packaged or stored to facilitate manual location of the item 106. In the depicted scenario 500, the human operator 108 may be provided with an image 118 depicting the container 202 containing the item 106. For example, the image 118 may be projected on to a surface of the container 202 or displayed on a second computing device 302(2) associated with the human operator 108. In some implementations, the location of the item 106 within the image 118 may be highlighted or otherwise accentuated to facilitate the visibility thereof. Providing an image 118 displaying the item 106 in the location in which it was stored, such as the container 202 containing one or more other objects 204, may improve efficiency and reduce errors of a human operator 108.

Figure 6:
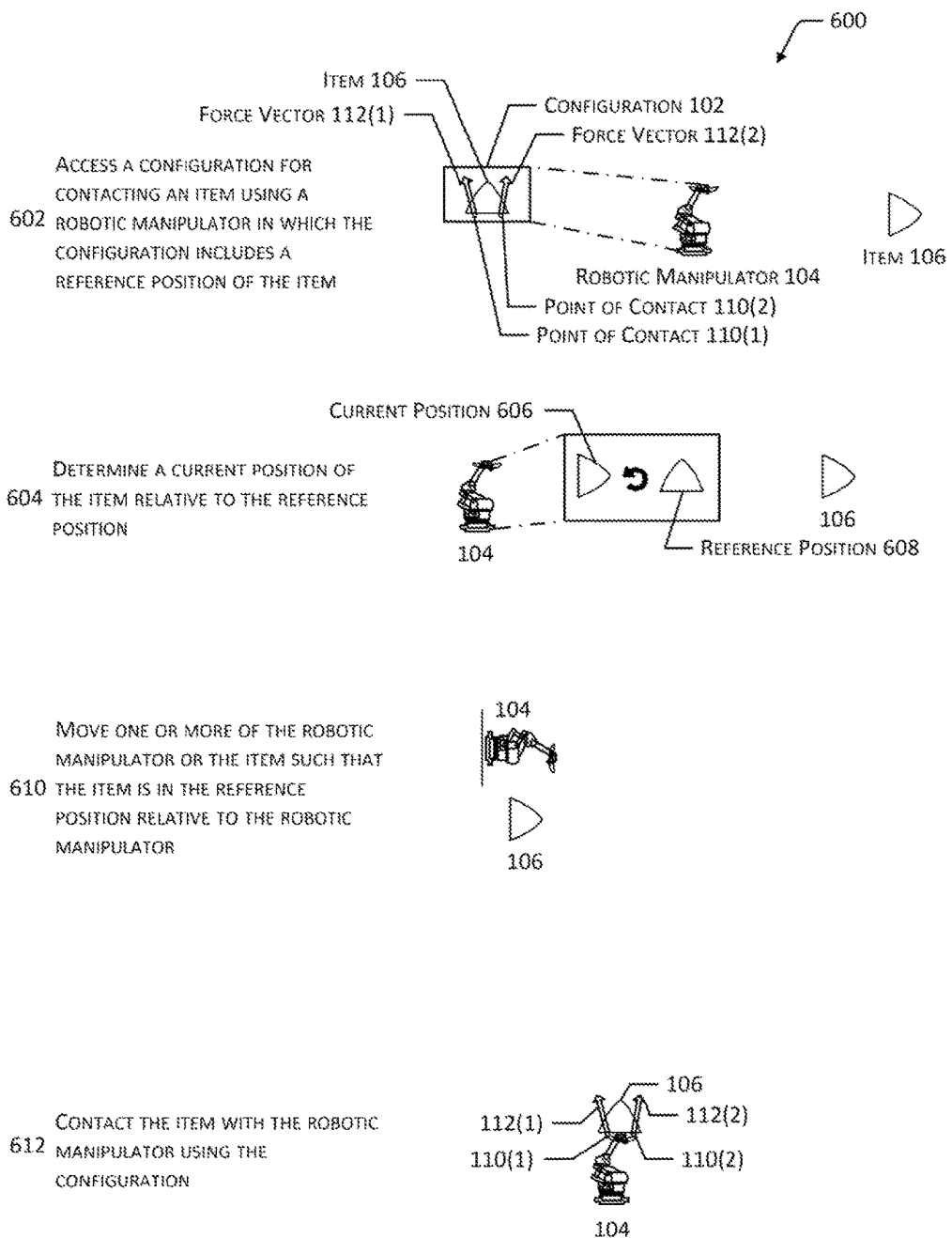
FIG. 6 is a scenario for using a configuration for a robotic manipulator to contact an item when the configuration is based on a reference position of the item.

FIG. 6 is a scenario 600 for using a configuration 102 for a robotic manipulator 104 to contact an item 106. In the depicted scenario 600, the configuration 102 may depend on the position of the item 106. For example, a robotic manipulator 104 may be configured to contact, grip, lift, or otherwise manipulate an item 106 when the item 106 is in a particular position (e.g., orientation) relative to the robotic manipulator 104. If the item 106 is in a different position, one or more of the robotic manipulator 104 or the item 106 may be moved relative to the other. For example, the robotic manipulator 104 may translate toward or away from the item 106 or rotate relative to the item 106. Alternatively, the item 106 may be moved toward or away from the robotic manipulator 104 or rotated relative to the robotic manipulator 104 by a human operator 108 or an automated device.

At 602, a configuration 102 for contacting an item 106 using a robotic manipulator 104 may be accessed from a data store 322. The configuration 102 may include a reference position of the item 106. For example, in the depicted scenario 600 a robotic manipulator 104 is shown adjacent to an item 106 that is in a first position. The robotic manipulator 104 may access a configuration 102 based on the item 106 being in a second position different from the first position. The depicted configuration 102 includes a first point of contact 110(1) and a second point of contact 110(2) at the base of the item 106. The configuration 102 also includes a first force vector 112(1) associated with the first point of contact 110(1) and a second force vector 112(2) associated with a second point of contact 110(2).

At 604, a current position 606 of the item 106 relative to a reference position 608 of the item 106 that corresponds to the position of the item 106 in the configuration 102 may be determined. In the depicted scenario 600, the robotic manipulator 104, or a server 122 or other computing device 302 in communication therewith, may determine the current position 606 of the item 106. For example, the current position 606 of the item 106 may be determined through use of a camera 116 or other type of sensor 114 associated with the robotic manipulator 104, the item 106, or the location of the item 106. The current position 606 may be compared with a reference position 608, which may be determined from the configuration 102. The direction and distance the item 106 or robotic manipulator 104 must move so that the item 106 is positioned in the reference position 608 relative to the robotic manipulator 104 may be determined by this comparison.

At 610, one or more of the robotic manipulator 104 or the item 106 may be moved such that the item 106 is in the reference position 608 relative to the robotic manipulator 104. In the depicted scenario 600, the robotic manipulator 104 has been rotated and secured to a perpendicular surface such that while the item 106 remained stationary, the item 106 is in the reference position 608 relative to the robotic manipulator 104. In other implementations, the item 106 may be moved relative to the robotic manipulator 104. Movement of the item 106 may be performed using the robotic manipulator 104, a human operator 108, or another device.

At 612, the robotic manipulator 104 may contact the item 106 using the configuration 102. For example, the robotic manipulator 104 may execute the configuration 102 to grip, lift, or otherwise move the item 106 from its reference position 608 by applying force vectors 112 to the points of contact 110 of the item 106 determined by the configuration 102.

Figure 7:
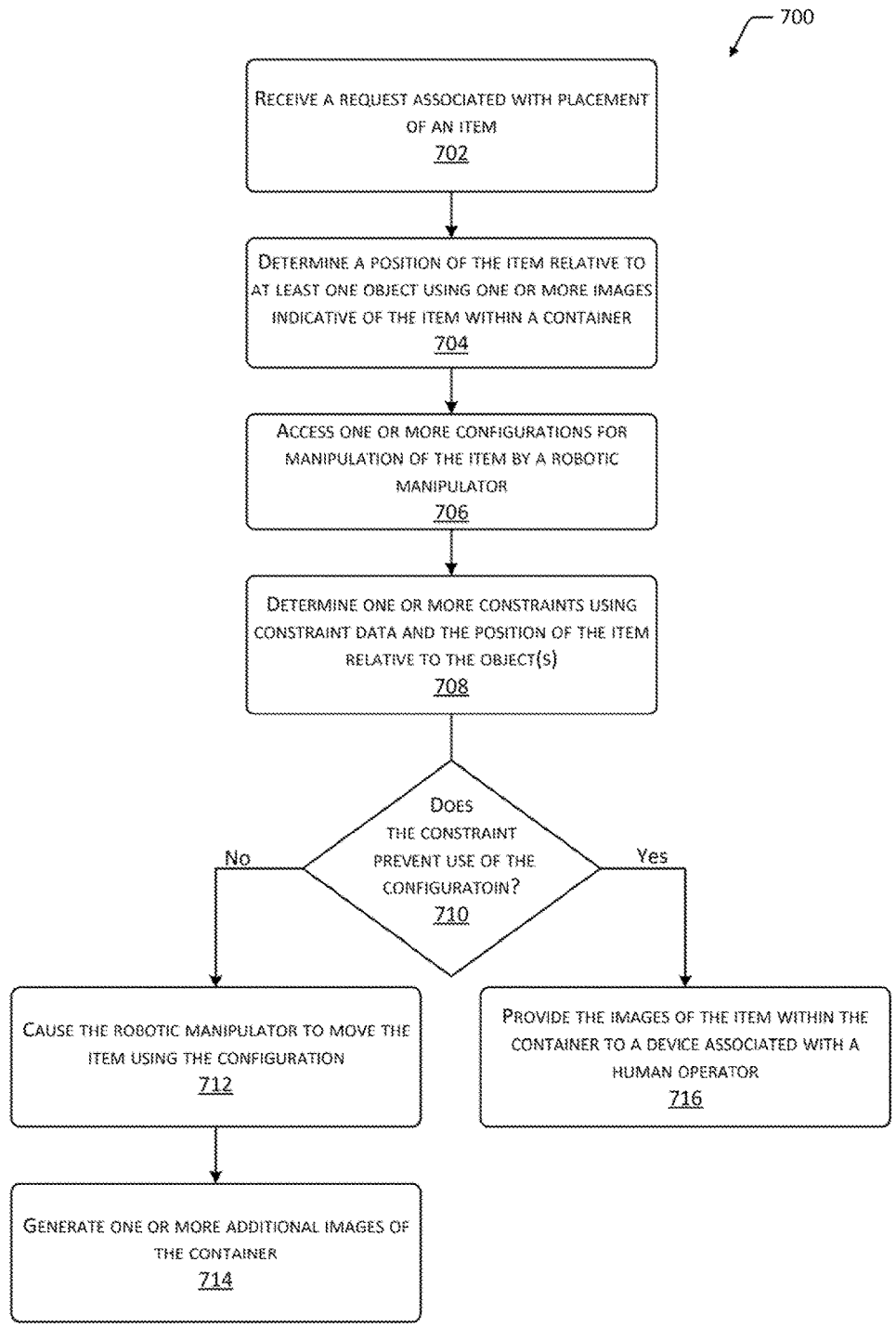
FIG. 7 is a flow diagram illustrating a process for determining whether a configuration for a robotic manipulator may be used to move an item based on the position of the item within a container relative to other objects.

FIG. 7 is a flow diagram 700 illustrating a process for determining whether a configuration 102 for a robotic manipulator 104 may be used to move an item 106 based on the position of the item 106 within a container 202 relative to other objects 204.

At 702, a request 504 associated with placement of an item 106 may be received from a computing device 302. The request 504 may include instructions to store an item 106 or to retrieve a stored item 106. For example, if an item 106 stored at a facility is purchased, the request 504 may include an instruction to retrieve the item 106 from a location within the facility. Location data 136 corresponding to the item 106 may be used to determine a current location of the item 106, and a robotic manipulator 104 or human operator 108 may move into proximity of the item 106. In other implementations, a container 202 containing the item 106 may be moved into proximity of the robotic manipulator 104 or human operator 108.

At 704, a position of the item 106 relative to at least one object 204 may be determined using one or more images 118 indicative of the item 106 within a container 202. In some implementations, one or more images 118 of the item 106 within the container 202 may be accessed from a data store 332. For example, images 118 of a container 202 after storage of an item 106 therein may be generated at the time the item 106 is stored. In other implementations, one or more images 118 of the item 106 within the container 202 may be acquired using a camera 116 associated with a robotic manipulator 104, human operator 108, or a location at which the container 202 is currently located. An image processing module 124 may process the one or more images 118 to determine the position of the item 106 within the container 202, relative to one or more other objects 204.

At 706, one or more configurations 102 for manipulation of the item 106 by a robotic manipulator 104 may be accessed from a server 122. As described previously, configurations 102 may be generated using one or more of the following: images 118 depicting human operators 108 interacting with items 106, sensor data 120, constraint data 130, item data 134, or location data 136. A configuration 102 may include one or more points of contact 110 between the robotic manipulator 104 and the item 106. A configuration 102 may also include one or more force vectors 112 associated with the one or more points of contact 110.

At 708, one or more constraints may be determined using constraint data 130 and the position of the item 106 relative to the objects 204 within the container 202. For example, the position of one or more objects 204 or the walls or other surfaces of the container 202 may prevent the robotic manipulator 104 from accessing the item 106. Continuing the example, the manipulator dimensions 220 associated with the portion of the robotic manipulator 104 configured to contact the item 106 may exceed the clearance within the container 202. In other circumstances, the item 106 may be accessible to a robotic manipulator 104 but oriented in a position that prevents successful execution of the configuration 102 by the robotic manipulator 104, such as failing to properly grip or otherwise manipulate the item 106. In some circumstances, the container 202 may be full or mostly full, the item 106 may not be readily visible or accessible, and the robotic manipulator 104 may not be configured to successfully move other objects 204 within the container 202.

At 710, a determination is made whether the constraint prevents use of the configuration 102 by the robotic manipulator 104. When the constraint does not prevent use of the configuration 102, then the process may proceed to 712. At 712, the robotic manipulator 104 may move the item 106 using the configuration 102. For example, the robotic manipulator 104 may grip or support the item 106 at one or more points of contact 110 corresponding to the configuration 102. The robotic manipulator 104 may also apply forces to the item 106 at the points of contact 110 corresponding to the force vectors 112 of the configuration 102. The robotic manipulator 104 may be used to move the gripped or supported item 106 into or from a container 202, to another location within a container 202 or facility, and so forth.

At 714, one or more additional images 118 of the container 202 may be generated. For example, after the item 106 is removed from the container 202, subsequent image(s) 118 may be generated to record the new state of the container 202. If a future request 504 to move an object 204 within the container 202 is received, the subsequent image(s) 118 may be used to determine constraints associated with movement of the object 204.

Returning to the determination at 710, when the constraint prevents use of the configuration 102, then the process proceeds to 716. At 716, the one or more images 118 of the item 106 within the container 202 may be provided to a device 506 associated with a human operator 108. Providing of the images 118 to the human operator 108 may facilitate manual location of the item 106 within the container 202. In some implementations, the location of the item 106 within the image(s) 118 may be indicated, such as through use of an outline, highlighting, a selected color or intensity, and so forth.

Figure 8:
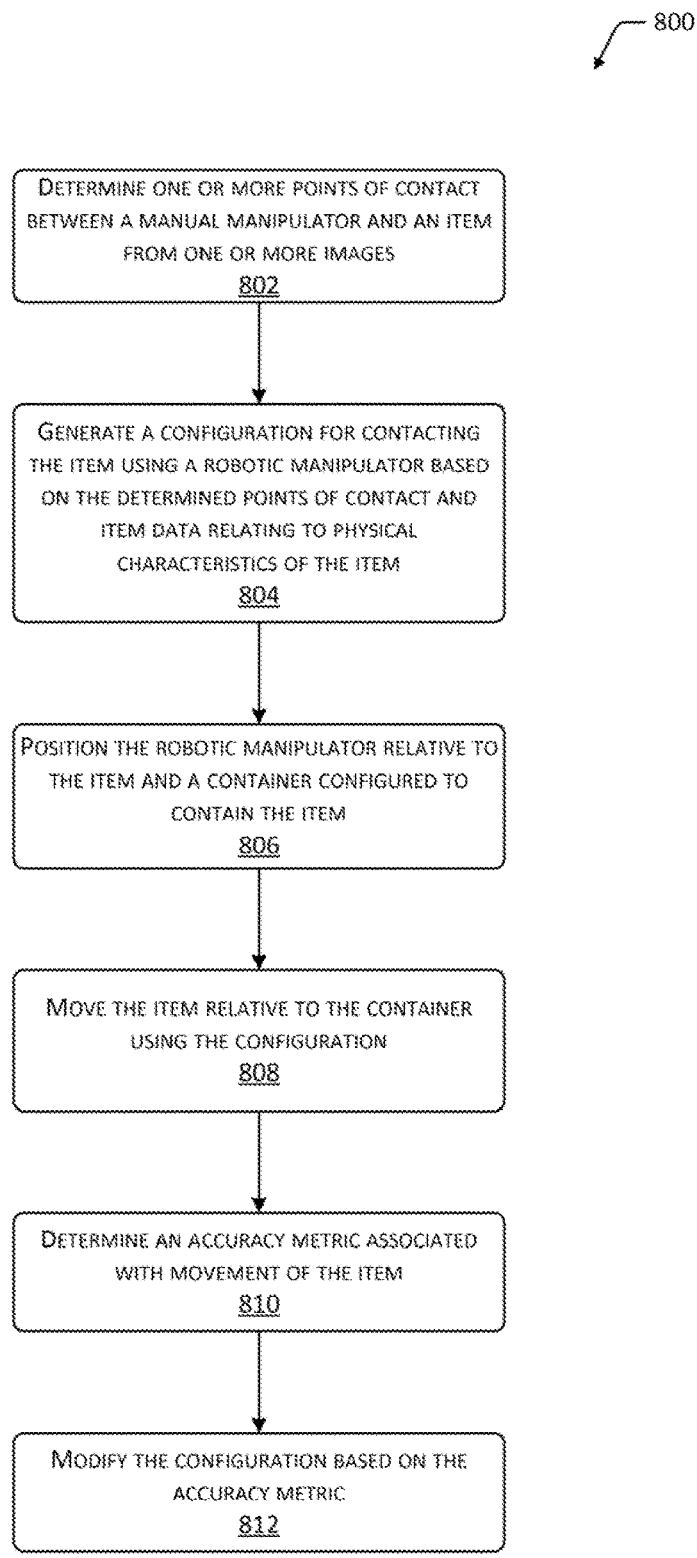
FIG. 8 is a flow diagram illustrating a process for generating a configuration for contacting the item, determining an accuracy metric associated with the configuration, and modifying the configuration based on the accuracy metric.

FIG. 8 is a flow diagram 800 illustrating a process for generating a configuration 102 for contacting the item 106, determining an accuracy metric associated with the configuration 102, and modifying the configuration 102 based on the accuracy metric.

At 802, one or more points of contact 110 between a manual manipulator (e.g., a human hand or a human-operated tool or device) and an item 106 may be determined from one or more images 118. For example, an image processing module 124 may determine the position of the body of a human operator 108 relative to that of an item 106 to identify portions of the body of the human operator 108 that contact the item 106 and the portions of the item 106 that are contacted. In some implementations, sensor data 120 from one or more sensors 114 may also be used to determine points of contact 110 and force vectors 112 associated with the points of contact 110.

At 804, a configuration 102 for contacting the item 106 using a robotic manipulator 104 may be generated. The configuration 102 may be based on the determined points of contact 110 and on item data 134 relating to one or more physical characteristics of the item 106. For example, the weight 232, dimensions 234, weight distribution 236, material characteristics 238, shape 240, and so forth, of the item 106 may affect the forces that may be applied to various portions of the item 106 and suitable points of contact 110 for gripping or supporting the item 106. The determinations made using the image(s) 118, in combination with the item data 134, may be processed by a configuration generation module 132 to determine suitable configurations 102 for interacting with the item 106 using a robotic manipulator 104. In some implementations, constraint data 130 relating to limitations of the robotic manipulator 104, limitations of the item 106, or physics-based constraints 228 may also be used to generate the configuration 102.

At 806, the robotic manipulator 104 may be positioned relative to the item 106 and a container 202 configured to contain the item 106. One or more of the robotic manipulator 104, the item 106, or the container 202 may be moved to place the robotic manipulator 104 into a position suitable to contact the item 104. The item 106 may be within or external to the container 202.

At 808, the item 106 may be moved relative to the container 202 using the configuration 102. For example, the robotic manipulator 104 may be used to grip, support, or otherwise manipulate the item 106, to move the item 106 from the exterior of the container 202 to a location inside the container 202. The robotic manipulator 104 may also be used to move the item 106 from the interior of the container 202 to a location external to the container 202. In some implementations, the container 202 may contain other objects 204.

At 810, an accuracy metric associated with movement of the item 106 may be determined. For example, the configuration generating module 132 may determine one or more of the following: whether the robotic manipulator 104 successfully gripped or supported the item 106, movement of the item 106 while being gripped or supported by the robotic manipulator 104, whether the item 106 was dropped by the robotic manipulator 104, whether the item 106 was damaged by contact with the robotic manipulator 104, movement of the robotic manipulator 104 into and from the interior of the container 202, or whether the container 202 was damaged by contact with the robotic manipulator 104 or the item 106.

At 812, the configuration 102 may be modified based on the accuracy metric. For example, if the item 106 moved significantly or was dropped by the robotic manipulator 104 due to insufficient friction between the robotic manipulator 104 and the item 106, the configuration 102 may be modified to increase the force magnitude 206 of one or more force vectors 112. If the item 106 moved significantly while gripped or supported by the robotic manipulator 104 or was dropped by the robotic manipulator 104 due to insufficient stability, the points of contact 110 may be changed, or the configuration 102 may be modified such that the robotic manipulator 104 moves more slowly. In some implementations, a horizontal support may be placed beneath the robotic manipulator 104 such that if the item 106 becomes disengaged from the robotic manipulator 104, the support may prevent the item 106 from becoming damaged. For example, a basket or net may be suspended below the robotic manipulator 104. The robotic manipulator 104 may be used to grip or otherwise engage the item 106 from the horizontal support surface to attempt to transfer the item into a container 202. If the robotic manipulator 104 contacts the walls of the container 202 or other objects 204 in the container 202, constraint data 130 may be generated to account for the manipulator dimensions 220.

The processes discussed herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   a robotic device for manipulating items;
   a non-transitory computer-readable medium storing computer-executable instructions; and
   a hardware processor, to execute the computer-executable instructions to:
      access image data indicating one or more interactions between an item and a manipulator for moving the item; and
      determine, based at least in part on the image data, at least one configuration for the robotic device to contact the item, the at least one configuration including one or more of:
         at least one point of contact between the robotic device and the item; or
         at least one force vector associated with contact between the robotic device and the item.

2. The system of claim 1, wherein the computer-executable instructions to determine the at least one configuration include computer-executable instructions to:
   determine, based on the one or more interactions, one or more points of contact between the manipulator and the item;
   determine, based on the one or more points of contact, one or more corresponding points of contact between the robotic device and the item; and
   determine the at least one point of contact of the at least one configuration based on the one or more corresponding points of contact.

3. The system of claim 1, wherein the computer-executable instructions to determine the at least one configuration include computer-executable instructions to:
   determine, based on the one or more interactions, one or more force vectors associated with contact between the manipulator and the item;
   determine based on the one or more force vectors, one or more corresponding force vectors between the robotic device and the item; and
   determine the at least one force vector of the at least one configuration based on the one or more corresponding force vectors.

4. The system of claim 1, further comprising computer-executable instructions to:
   access constraint data indicative of one or more of: dimensions, points of contact, or movement, associated with the robotic device;
   wherein the at least one configuration is further determined based in part on the constraint data.

5. The system of claim 1, further comprising computer-executable instructions to:
- access item data indicative of one or more of a weight distribution, a center of mass, or a material characteristic of at least a portion of the item;
- wherein the at least one configuration is further determined based in part on the item data.

6. The system of claim 5, further comprising computer-executable instructions to:
- determine the one or more of the weight distribution, the center of mass, or the material characteristic based at least in part on the image data.

7. The system of claim 1, further comprising computer-executable instructions to:
- access sensor data indicative of at least one interaction between the item and the manipulator; and
- determine, based on the sensor data, one or more of:
  - one or more points of contact between the item and the manipulator; or
  - one or more force vectors corresponding to a force applied by the manipulator to the item;
- wherein the at least one configuration is further determined based in part on the sensor data.

8. The system of claim 1, wherein the at least one configuration includes a first configuration and a second configuration, the system further comprising computer-executable instructions to:
- receive a request to manipulate a particular item;
- determine one or more of a location or an orientation of the particular item; and
- based on the one or more of the location or the orientation, select the first configuration for manipulating the particular item.

9. A system comprising:
- a robotic device for manipulating items;
- a non-transitory computer-readable medium storing computer-executable instructions; and
- a hardware processor, to execute the computer executable instructions to:
  - access constraint data indicative of one or more of: dimensions, points of contact, or movement, associated with the robotic device;
  - access item data indicative of one or more of a weight distribution, a center of mass, or a material characteristic of at least a portion of an item; and
  - determine, based at least in part on the constraint data and the item data, at least one configuration for the robotic device to contact the item, the at least one configuration including one or more of:
    - at least one point of contact between the robotic device and the item; or
    - at least one force vector associated with contact between the robotic device and the item.

10. The system of claim 9, further comprising computer-executable instructions to:
- access image data indicative of one or more interactions between the item and a manipulator for moving the item;
- determine, based on the image data, one or more of a point of contact between the manipulator and the item or a force vector associated with contact between the manipulator and the item;
- wherein the at least one configuration is further determined based at least in part on the image data.

11. The system of claim 9, further comprising computer-executable instructions to:
- access image data indicative of one or more interactions between the item and a manipulator for moving the item; and
- determine at least a portion of the item data based at least in part on the image data.

12. The system of claim 9, further comprising computer-executable instructions to:
- access sensor data indicative of at least one interaction between the item and a manipulator; and
- determine, based on the sensor data, one or more of:
  - one or more points of contact between the item and the manipulator; or
  - one or more force vectors corresponding to a force applied by the manipulator to the item;
- wherein the at least one configuration is further determined based in part on the sensor data.

13. The system of claim 9, wherein the at least one configuration includes a first configuration and a second configuration, the system further comprising computer-executable instructions to:
- receive a request to manipulate a particular item;
- determine one or more of a location or an orientation of the particular item; and
- based on the one or more of the location or the orientation, select the first configuration for manipulating the particular item.

14. A method comprising:
- accessing one or more of:
  - constraint data indicative of one or more of: dimensions, points of contact, or movement, associated with a robotic device; or
  - item data indicative of one or more of a weight distribution, a center of mass, or a material characteristic of at least a portion of an item; and
- determining, based at least in part on the one or more of the constraint data or the item data, at least one configuration for the robotic device to contact the item, the at least one configuration including one or more of:
  - at least one point of contact between the robotic device and the item; or
  - at least one force vector associated with contact between the robotic device and the item.

15. The method of claim 14, further comprising:
- accessing image data indicative of one or more interactions between the item and a manipulator for moving the item;
- determining, based on the image data, one or more of a point of contact between the manipulator and the item or a force vector associated with contact between the manipulator and the item;
- wherein the at least one configuration is further determined based at least in part on the image data.

16. The method of claim 14, further comprising:
- accessing image data indicative of one or more interactions between the item and a manipulator for moving the item; and
- determining at least a portion of the item data based at least in part on the image data.

17. The method of claim 14, further comprising:
- accessing sensor data indicative of at least one interaction between the item and a manipulator; and
- determine, based on the sensor data, one or more of:
  - one or more points of contact between the item and the manipulator; or
  - one or more force vectors corresponding to a force applied by the manipulator to the item;

wherein the at least one configuration is further determined based in part on the sensor data.

18. The method of claim 14, wherein the at least one configuration includes a first configuration and a second configuration, the method further comprising:
   receiving a request to manipulate a particular item;
   determining one or more of a location or an orientation of the particular item;
   determining correspondence between the first configuration and the one or more of the location or the orientation; and
   causing the robotic device to manipulate the particular item based in part on the first configuration.

19. The method of claim 14, wherein the at least one configuration includes a first configuration and a second configuration, the method further comprising:
   receiving a request to manipulate a particular item;
   accessing location data associated with the particular item, wherein the location data is indicative of an orientation of the particular item; and
   selecting the first configuration for manipulating the item based on the orientation.

20. The method of claim 14, wherein the location data includes one or more images depicting the particular item within a container that contains the particular item and one or more other items, the method further comprising:
   determining the orientation of the item based on the one or more images.

* * * * *